(12) United States Patent
Vakil et al.

(10) Patent No.: US 11,897,036 B2
(45) Date of Patent: *Feb. 13, 2024

(54) MULTIPOD NANOSTRUCTURES AND METHODS

(71) Applicant: The Florida State University Research Foundation, Inc., Tallahassee, FL (US)

(72) Inventors: Parth Nalin Vakil, Tallahassee, FL (US); Geoffrey F. Strouse, Tallahassee, FL (US)

(73) Assignee: The Florida State University Research Foundation, Inc., Tallahassee, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/937,634

(22) Filed: Oct. 3, 2022

(65) Prior Publication Data

US 2023/0055341 A1    Feb. 23, 2023

Related U.S. Application Data

(63) Continuation of application No. 16/360,310, filed on Mar. 21, 2019, now Pat. No. 11,491,539.

(60) Provisional application No. 62/646,055, filed on Mar. 21, 2018.

(51) Int. Cl.
| | |
|---|---|
| *B22F 9/24* | (2006.01) |
| *B22F 1/054* | (2022.01) |
| *B82Y 40/00* | (2011.01) |
| *B22F 1/0545* | (2022.01) |

(52) U.S. Cl.
CPC ............ *B22F 9/24* (2013.01); *B22F 1/0553* (2022.01); *B22F 1/054* (2022.01); *B22F 1/056* (2022.01); *B22F 1/0545* (2022.01); *B22F 2202/11* (2013.01); *B22F 2301/15* (2013.01); *B22F 2301/25* (2013.01); *B22F 2999/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 7,927,516 B2 | 4/2011 | Strouse et al. | |
| 8,414,746 B2 | 4/2013 | Strouse et al. | |
| 11,491,539 B2 * | 11/2022 | Vakil | B22F 9/24 |
| 2005/0204865 A1 * | 9/2005 | Hirai | G11B 5/70605 |
| | | | 75/348 |
| 2011/0218364 A1 | 9/2011 | Porter et al. | |

(Continued)

OTHER PUBLICATIONS

Ashley et al., Influence of Microwave Frequency and Power on Nanometal Growth, J. Phys. Chem. C, 2018, 122:3617-3627.

(Continued)

*Primary Examiner* — George Wyszomierski
(74) *Attorney, Agent, or Firm* — Eversheds Sutherland (US) LLP

(57) ABSTRACT

Methods of forming metal multipod nanostructures. The methods may include providing a mixture that includes a metal acetylacetonate, a reducing agent, and a carboxylic acid. The mixture may be contacted with microwaves to form the metal multipod nanostructures. The methods may offer control over the structure and/or morphology of the metal multipod nanostructures.

12 Claims, 20 Drawing Sheets

(56) References Cited

U.S. PATENT DOCUMENTS

| | | |
|---|---|---|
| 2013/0133483 A1 | 5/2013 | Yang et al. |
| 2014/0072642 A1 | 3/2014 | Montaner Villalonga et al. |
| 2015/0129813 A1* | 5/2015 | Peng .................. H01B 13/003 |
| | | 252/514 |
| 2017/0069412 A1 | 3/2017 | Strouse et al. |
| 2018/0221961 A1 | 8/2018 | Bakr et al. |
| 2018/0361482 A1 | 12/2018 | Moglianetti et al. |

OTHER PUBLICATIONS

Ashley et al., Microwave Enhancement of Autocatalytic Growth of Nanometals, ACS Nano, 2017, 11:9957-9967.

Cozzoli et al., Colloidal synthesis and characterization of tetrapod-shaped magnetic nanocrystals, Nano letters 6.9 (2006): 1966-1972.

Cozzoli et al., Colloidal synthesis and characterization of tetrapod-shaped magnetic nanocrystals, Nano letters 6.9 (2006): Supporting Information: 1-14.

Muthuswamy et al., Synthetic Levers Enabling Independent Control of Phase, Size, and Morphology in Nickel Phosphide Nanoparticles, ACS nano 5.3 (2011): 2402-2411.

Mourdikoudis et al., Oleylamine in nanoparticle synthesis, Chemistry of Materials 25.9 (2013): 1465-1476.

* cited by examiner

MULTIPOD NANOSTRUCTURES AND METHODS

CROSS-REFERENCE TO RELATED APPLICATIONS

This application is a continuation of U.S. patent application Ser. No. 16/360,310, filed Mar. 21, 2019, now U.S. Pat. No. 11,491,539, which claims priority to U.S. Provisional Patent Application No. 62/646,055, filed Mar. 21, 2018, which are incorporated by reference herein.

STATEMENT REGARDING FEDERALLY SPONSORED RESEARCH AND DEVELOPMENT

This invention was made with government support under CHE 1608364 awarded by the National Science Foundation. The government has certain rights in the invention.

BACKGROUND

According to the relevant literature, the growth of metal nanoparticles typically follows an autocatalytic 2-step Finke-Watsky mechanism, wherein the first step is a relatively slow reduction step ($k_1$) of a cationic precursor in solution by a weak reducing agent, followed by a second, relatively fast reduction step ($k_2$) of the cation precursor at a surface of the growing nanoparticle.

In the autocatalytic mechanism, usually $k_2 \gg k_1$, which typically causes growth to be dominated by the nanoparticle surface. Factors that can lead to hyper-branching may include the nuclei morphology, the facet stability for a given metal, the reaction conditions, and the face selective binding of ligands. While spherical particles are desirable for certain applications, branched metal nanoparticles having a high surface area may be attractive for a number of applications, including catalysis and plasmonic applications.

Several mechanisms have been suggested to explain multipod growth. One of the suggested mechanisms is driven by preferential growth of the (111) facet, which is initiated by an overgrowth mechanism occurring on nucleated cubic (fcc) or pyramidyl (hcp) nanometal seeds.

Recent studies have revealed that branching, at least for face-centered cubic (fcc) metals, may be achieved by initial overgrowth on high energy vertex and edge sites corresponding to the (111) facets. It has been revealed that morphology control may be achieved by facilitating preferential growth along the (111) facet, wherein such growth is initiated by (111) overgrowth on nucleated cubic (fcc) nanometal seeds. Recent studies have applied this concept to a number of metals, and the studies have shown that materials with a rapid metal reorganization can lead primarily to isotropic structures (e.g., Au, Ag, Cu), while structures with a slow reorganization can grow readily as anisotropic structures (e.g., Ni, Pd, Pt).

Isolating only multipods can be a complex process, and typical reactions yield a distribution of morphologies. Typically, convective reactions require careful control of the temperature, the ligand content, and/or often require long reaction times in a reducing environment ($H_2$).

The use of microwave (MW) chemistry for nanomaterials synthesis has attracted attention, due, at least in part, to the enhancement of reaction rates and/or reproducibility of the materials when carried out in a single mode MW reactor. The observed enhancement is likely not due to the energy absorbed per MW photon, as it does not contain enough energy to break a bond, but rather to enhanced growth rates, which reflect the evolving dielectric loss tangent for a growing nanoparticle. The size-dependent loss tangent may reflect the repolarization of the electric field, as disclosed within the Maxwell-Wagner (M-W) model. Such polarization effects are believed to be enhanced at sharp tips and edges, leading to enhanced heating at these sites in a growing metal. This is commonly referred to as a "lightning rod" effect because the shaft tips and edges can generate very high electric fields in their vicinity due to the surface charge density in those regions.

Although multipod Ni-, Pt-, and Pd nanoparticles have been reported, the current methods of producing these multipods generally do not permit systematic control of arm length, aspect ratio, or a combination thereof. Moreover, the methods often require long reaction times and/or one or more other features that can limit their scalability.

In order to realize the benefits of nanostructured materials, including hyper-branched nanostructured materials, there remains a need for simple, economical, scalable, reliable and/or efficient routes for their synthesis, including routes that rely on microwave-driven chemistry, which may provide control over nanomaterial growth and/or morphology.

BRIEF SUMMARY

Provided herein are microwave-driven methods of forming metal multipod nanostructures that provide control over nanomaterial growth, morphology, or a combination thereof. Also provided are metal multipod nanostructures.

In one aspect, methods of forming metal multipod nanostructures are provided. In some embodiments, the methods include [i] providing a mixture disposed in a microwave reaction vessel, wherein the mixture includes a metal acetylacetonate, a reducing agent that includes a $C_1$-$C_{30}$ hydrocarbyl-amine, and a carboxylic acid of formula (A)—

formula (A)

wherein R is a monovalent $C_1$-$C_3$ hydrocarbyl; and [ii] contacting the mixture with microwaves to form the metal multipod nanostructures. In some embodiments, the contacting of the mixture with microwaves includes (a) contacting the mixture with a first plurality of microwaves effective to heat the mixture to a first temperature, (b) reducing the first temperature of the mixture to a second temperature, and (c) contacting the mixture with a second plurality of microwaves for a time effective to heat the mixture to the first temperature. Steps (b) and (c) may be repeated from 1 to 8 times, or more.

In some embodiments, the methods include (i) providing a mixture disposed in a microwave reaction vessel, the mixture including (a) nickel acetylacetonate, (b) oleylamine, and (c) oleic acid, (ii) contacting the mixture with a first plurality of microwaves effective to heat the mixture to a first temperature, wherein the first temperature is about 260° C. to about 300° C., (iii) reducing the first temperature of the mixture to a second temperature, wherein the second temperature is about 220° C. to about 250° C., (iv) contacting the mixture with a second plurality of microwaves for a time effective to heat the mixture to the first temperature, (v) reducing the first temperature of the mixture to the second temperature, and (vi) contacting the mixture with the second plurality of microwaves for the time effective to heat the mixture to the first temperature. The time effective to heat the mixture to the first temperature with the second plurality of microwaves may be about 1 minute to about 20 minutes. In some embodiments, the methods also include repeating steps (v) and (vi) from 1 to 20 times.

Additional aspects will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1:
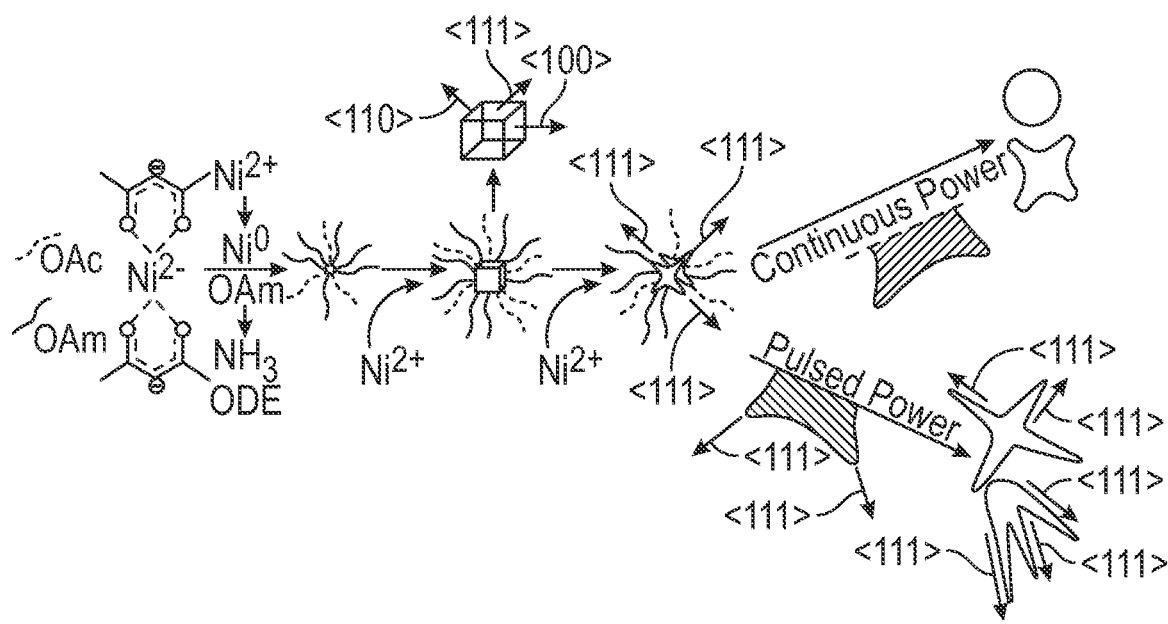
FIG. 1 depicts a schematic of an embodiment of nickel multipod formation.

Embodiments of the methods provided herein include the use of pulsed (i.e., cycled) microwave-based heating to achieve the rapid synthesis of highly branched, pure phase fcc crystalline nickel mulitpod nanostructures with a multipod population of >99%. In some embodiments, the multipod structures may be formed in minutes (e.g., 5 to 20 minutes) under ambient conditions in a relatively simple reaction system, an example of which includes nickel acetylacetonate ($Ni(acac)_2$), oleylamine (OAm) and oleic acid (OAc).

In some embodiments, controlling the power delivery to a reaction mixture through pulsing allows the growth kinetics of the metallic nanostructures to be controlled, thereby permitting the formation of multipods having arms with different aspect ratios. The arm length of the metal multipod nanostructures may be proportional to the number of pulses (i.e., cycles), and the core size may be controlled by continuous power delivery.

The methods provided herein may permit [1] the rapid synthesis of single phase fcc Ni multipods using pulsed microwave heating at high temperature, [2] the synthesis of multipods that are uniform and/or stable at high temperature, [3] the synthesis of magnetic multipod structures, which may exhibit coercivity that can vary with aspect ratio, [4] the use of MW power and/or pulsing to control multipod morphology, [5] selective microwave heating at the tips of nanostructures so that the nanostructures' arms elongate relatively rapidly, or [6] a combination thereof.

Methods

Methods are provided herein for forming metal multipod nanostructures. In some embodiments, the methods include providing a mixture, and contacting the mixture with microwaves to form the metal multipod nanostructures. The contacting of a mixture with microwaves may include irradiating the mixture, a microwave reaction vessel in which the mixture is disposed, or a combination thereof with the microwaves to heat the mixture.

The mixture may be disposed in a microwave reaction vessel. The phrase "microwave reaction vessel", as used herein, generally refers to an apparatus that has a reservoir in which a mixture may be disposed, and is formed of one or more materials that permits microwaves to heat the mixture. The microwave reaction vessel, for example, may be a glass vessel or a silicon carbide vessel.

In some embodiments, the mixtures include a metal acetylacetonate, a reducing agent comprising a $C_1$-$C_{30}$ hydrocarbyl-amine, and a carboxylic acid of formula (A) —

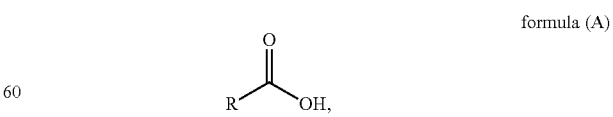

formula (A)

wherein R is a monovalent $C_1$-$C_{30}$ hydrocarbyl.

In some embodiments, the metal acetylacetonate includes a nickel (Ni) acetylacetonate. In some embodiments, the metal acetylacetonate includes a Pt acetylacetonate, a Pd acetylacetonate, a Cu acetylacetonate, a Co acetylacetonate, a Au acetylacetonate, an Fe acetylacetonate, or a Rh acetylacetonate. The metal acetylacetonate may include an acetate precursor.

In some embodiments, the reducing agent includes a $C_1$-$C_{30}$ hydrocarbyl-amine. As used herein, the phrase "$C_1$-$C_{30}$ hydrocarbyl-amine" generally refers to a monovalent or multivalent $C_1$-$C_{30}$ hydrocarbyl that is substituted with at least one amine. The amine may be a terminal amine. The amine may include a primary amine, a secondary amine, tertiary amine, or a combination thereof. The amine may be a terminal primary amine.

In some embodiments, the $C_1$-$C_{30}$ hydrocarbyl-amine is an unsaturated $C_1$-$C_{30}$ hydrocarbyl-amine. As used herein, the phrase "unsaturated $C_1$-$C_{30}$ hydrocarbyl-amine" refers to a $C_1$-$C_{30}$ hydrocarbyl-amine that includes at least one non-single bond, such as a double bond.

In some embodiments, the $C_1$-$C_{30}$ hydrocarbyl-amine is a $C_5$-$C_{30}$ hydrocarbyl-amine, a $C_{10}$-$C_{30}$ hydrocarbyl-amine, a $C_{15}$-$C_{30}$ hydrocarbyl-amine, a $C_{15}$-$C_{25}$ hydrocarbyl-amine, or a $C_{15}$-$C_{20}$ hydrocarbyl-amine, which may be saturated or unsaturated. In some embodiments, the $C_1$-$C_{30}$ hydrocarbyl-amine is oleylamine.

The metal acetylacetonate and the reducing agent may be present at any mole ratio that is effective to form the metal multipod nanostructures. In some embodiments, the metal acetylacetonate and the reducing agent are present in the mixture at a mole ratio of about 0.3:25 to about 3:25. In some embodiments, the metal acetylacetonate and the reducing agent are present in the mixture at a mole ratio of about 0.3:25 to about 2:25. In some embodiments, the metal acetylacetonate and the reducing agent are present in the mixture at a mole ratio of about 0.3:25 to about 1:25. In some embodiments, the metal acetylacetonate and the reducing agent are present in the mixture at a mole ratio of about 0.5:25 to about 1:25. In some embodiments, the metal acetylacetonate and the reducing agent are present in the mixture at a mole ratio of about 0.75:25.

The mixture may include a carboxylic acid of formula (A)

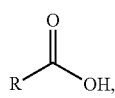

formula (A)

wherein R is a monovalent $C_1$-$C_{30}$ hydrocarbyl. In some embodiments, the $C_1$-$C_{30}$ hydrocarbyl—is an unsaturated $C_1$-$C_{30}$ hydrocarbyl. As used herein, the phrase "unsaturated $C_1$-$C_3$ hydrocarbyl" refers to a $C_1$-$C_{30}$ hydrocarbyl that includes at least one non-single bond, such as a double bond. In some embodiments, the $C_1$-$C_{30}$ hydrocarbyl is a $C_5$-$C_{30}$ hydrocarbyl, a $C_{10}$-$C_{30}$ hydrocarbyl, a $C_{15}$-$C_{30}$ hydrocarbyl, a $C_{15}$-$C_{25}$ hydrocarbyl, or a $C_{15}$-$C_{20}$ hydrocarbyl, which may be saturated or unsaturated. In some embodiments, the carboxylic acid of formula (A) is oleic acid.

The reducing agent and the carboxylic acid of formula (A) may be present in the mixture at any mole ratio that is effective to form the metal multipod nanostructures. In some embodiments, the reducing agent and the carboxylic acid of formula (A) are present in the mixture at a mole ratio of about 25:2 to about 25:8. In some embodiments, the reducing agent and the carboxylic acid of formula (A) are present in the mixture at a mole ratio of about 25:3 to about 25:7. In some embodiments, the reducing agent and the carboxylic acid of formula (A) are present in the mixture at a mole ratio of about 25:4 to about 25:6. In some embodiments, the reducing agent and the carboxylic acid of formula (A) are present in the mixture at a mole ratio of about 25:5.

The methods herein generally may include contacting a mixture with microwaves. The microwaves may be applied in one or more modes described herein, including a pulsed (i.e., cycled) mode, a constant power mode, and a constant temperature mode.

Pulse Mode (i.e. Cycle Mode): In some embodiments, the contacting of the mixture with microwaves includes (i) contacting the mixture with a first plurality of microwaves effective to heat the mixture to a first temperature, (ii) reducing the first temperature of the mixture to a second temperature, and (iii) contacting the mixture with a second plurality of microwaves for a time effective to heat the mixture to the first temperature. The contacting of the mixture with the second plurality of microwaves may be referred to herein as a "pulse of microwaves", a "pulse", a "cycle", a "cycle of microwaves", a "cycle of microwave power", or the like. The contacting of the mixture with the microwaves may include contacting the mixture with two or more pulses of the microwaves by repeating steps (ii) and (iii) one or more times, for example, from 1 to 20 times, 1 to 14 times, or 6 to 11 times. Therefore, the contacting of the mixture with the microwaves may include contacting the mixture with 0 to 21 pulses, 0 to 15 pulses, or 7 to 12 pulses of the microwaves.

In some embodiments, the first temperature is about 260° C. to about 300° C. In some embodiments, the first temperature is about 280° C.

In some embodiments, the second temperature is about 220° C. to about 250° C. In some embodiments, the second temperature is about 240° C.

The reducing of the first temperature of the mixture to a second temperature may be achieved by any known active and/or passive technique. For example, the reducing of the first temperature of the mixture to a second temperature may be achieved by allowing the mixture to cool in the absence of microwaves. As a further example, the reducing of the first temperature of the mixture to a second temperature may include contacting a vessel and/or mixture with a gas flow, i.e., air flow, which may be provided by a fan or other apparatus.

In some embodiments, the time effective to heat the mixture to the first temperature with the second plurality of microwaves is about 1 minute to about 30 minutes, about 1 minute to about 20 minutes, about 3 minutes to about 20 minutes, or about 7 minutes to about 12 minutes. The time effective to heat the mixture to the first temperature with the second plurality of microwaves may the same for each pulse, or may differ for one or more of the pulses. For example, each of the 0 to 21 pulses, 0 to 15 pulses, or 7 to 12 pulses of the microwaves may be applied for a time period that (i) is independently selected for each pulse, and (ii) selected from about 3 to about 30 minutes, or about 7 to about 12 minutes.

Not wishing to be bound by any particular theory, the number of pulses may control, at least in part, the arm length of the multipod nanostructures. Therefore, the methods herein may include selecting a number of pulses effective to achieve a desired arm length.

Not wishing to be bound by any particular theory, the width of one or more pulses may control, at least in part, the aspect ratio of the arms. The pulse width (i.e., pulse power, e.g., 250 W, 150 W, etc.) can affect the heating rate of a mixture from a second temperature to a first temperature. Therefore, the methods provided herein may include selecting a width of the one or more pulses effective to impart the arms with a desired aspect ratio.

In some embodiments, the arm length of Ni multipod nanostructures is controlled by the number of pulses and/or pulse power applied during growth. In some embodiments, Ni multipod nanostructures with arms that are 230 nm in length and 51 nm in width (an aspect ratio of 4.5) are prepared by sequential pulsing (9 pulses) in a 2.45 GHz MW single mode cavity (300W) within a total time of 10 minutes. The aspect ratio may be systematically reduced with fewer pulses. The resulting multipod nanostructures may be highly crystalline metallic single phase fcc nickel structures that exhibit magnetic coercivity that varies with the aspect ratio of the arms.

Constant Temperature Mode: In some embodiments, the contacting of a mixture with microwaves includes contacting the mixture with a first plurality of microwaves effective to heat the mixture to a first temperature, and contacting the mixture with a second plurality of microwaves effective to maintain the first temperature for a time effective to form the metal multipod nanostructures, wherein the second plurality of microwaves includes microwaves of different wattages. The wattages of the second plurality of microwaves may be adjusted, manually or automatically, to maintain the first temperature of the mixture.

In some embodiments, the first temperature is about 260° C. to about 300° C. In some embodiments, the first temperature is about 280° C.

Constant Power Mode: In some embodiments, the contacting of a mixture with microwaves includes contacting the mixture with a first plurality of microwaves effective to heat the mixture to a first temperature, and contacting the mixture with a second plurality of microwaves for a time effective to form the metal multipod nanostructures, wherein the second plurality of microwaves consists of microwaves of the same wattage. Therefore, the wattage of the second plurality of microwaves, in some embodiments, remains unchanged during a process or a portion thereof. For example, the second plurality of microwaves may have a power (e.g., 300 W), and the power is not changed in response to a temperature change of the mixture. In some embodiments, the power of the first plurality of microwaves and the power of the second plurality of microwaves is identical. The first plurality of microwaves and second plurality of microwaves may be administered sequentially in a continuous or discontinuous manner.

In some embodiments, the first temperature is about 260° C. to about 300° C. In some embodiments, the first temperature is about 280° C.

Not wishing to be bound by any particular theory, core nanocrystal size may be systematically controlled by a process that combines constant power mode and pulse mode. The systematic control may be imparted by the local electric field enhancement of the impinging microwave electromagnetic radiation of the overgrowth (111) tips in fcc metals through a "lightning rod effect."

Not wishing to be bound by any particular theory, it is believed that the interaction of high-power (and short time) MW pulses with the growing Ni nanoparticle may produce local tip heating, which can lead to (111) growth of arms. In constant power mode, the system may reach equilibrium and the growth of the (111) face may be in competition with nanocrystal reconstruction to minimize surface energy. Reactions using low-power pulses (which can result in longer times to reach a first temperature from a second temperature) or constant continuous power may lead to nanostructures without long arm lengths.

Generally, the microwaves used in the foregoing modes may have any frequency effective to form multipod nanostructures. In some embodiments, the microwaves have a frequency of at least 2 GHz or at least 2.45 GHz. In some embodiments, the microwaves have a frequency of 2.45 GHz.

Metal Multipod Nanostructures

The metal multipod nanostructures produced according to embodiments of the methods herein may have 1 to 8 arms. In some embodiments, the one or more metal multipod nanostructures have 1 to 8 arms, and an average of 4 to 6 arms. In some embodiments, the methods described herein produce a plurality of metal multipod nanostructures, of which at least 95%, by weight, of the metal multipod nanostructures have 1 to 8 arms, an average of 4 to 6 arms, or a combination thereof.

The metal multipod nanostructures produced according to embodiments of the methods described herein may include arms having an average aspect ratio of about 1 to about 5, about 2 to about 5, about 3 to about 5, or about 4 to about 5. In some embodiments, the metal multipod nanostructures have arms having an average aspect ratio about 4.5. For example, Ni multipods produced according to embodiments of the methods described herein have arms that are about 230 nm in length and about 51 nm in width, which imparts the arms with an aspect ratio of about 4.5.

The metal multipod nanostructures produced according to embodiment of the methods described herein may have arms having an average length of about 0.1 nm to about 300 nm, about 100 nm to about 300 nm, or about 200 nm to about 300 nm.

The phrase "$C_1$-$C_{30}$ hydrocarbyl," and the like, as used herein, generally refer to aliphatic, aryl, or arylalkyl groups containing 1 to 30 carbon atoms. Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having 1 to 30 carbon atoms. Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl and dodecyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl. Examples of aryl or arylalkyl moieties include, but are not limited to, anthracenyl, azulenyl, biphenyl, fluorenyl, indan, indenyl, naphthyl, phenanthrenyl, phenyl, 1,2,3,4-tetrahydro-naphthalene, tolyl, xylyl, mesityl, benzyl, and the like, including any heteroatom substituted derivative thereof.

Unless otherwise indicated, the term "substituted," when used to describe a chemical structure or moiety, refers to a derivative of that structure or moiety wherein one or more of its hydrogen atoms is substituted with a chemical moiety or functional group such as alcohol, alkoxy, alkanoyloxy, alkoxycarbonyl, alkenyl, alkyl (e.g., methyl, ethyl, propyl, t-butyl), alkynyl, alkylcarbonyloxy (—OC(O)alkyl), amide (—C(O)NH—alkyl—or —alkylNHC(O)alkyl), tertiary amine (such as alkylamino, arylamino, arylalkylamino), aryl, aryloxy, azo, carbamoyl (—NHC(O)O—alkyl—or —OC(O)NH—alkyl), carbamyl (e.g., $CONH_2$, as well as CONH—alkyl, CONH—aryl, and CONH—arylalkyl), carboxyl, carboxylic acid, cyano, ester, ether (e.g., methoxy, ethoxy), halo, haloalkyl (e.g., —$CCl_3$, —$CF_3$, —$C(CF_3)_3$), heteroalkyl, isocyanate, isothiocyanate, nitrile, nitro, phosphodiester, sulfide, sulfonamido (e.g., $SO_2NH_2$), sulfone, sulfonyl (including alkylsulfonyl, arylsulfonyl and arylalkylsulfonyl), sulfoxide, thiol (e.g., sulfhydryl, thioether) or urea (—NHCONH—alkyl—).

In the descriptions provided herein, the terms "includes," "is," "containing," "having," and "comprises" are used in an open-ended fashion, and thus should be interpreted to mean "including, but not limited to." When structures or methods are claimed or described in terms of "comprising" various components or processing features, the structures and methods can also "consist essentially of" or "consist of" the various components or processing features, unless stated otherwise.

The terms "a," "an," and "the" are intended to include plural alternatives, e.g., at least one. For instance, the disclosure of "a multipod," "a $C_1$-$C_{30}$ hydrocarbyl-amine," and the like, is meant to encompass one, or mixtures or combinations of more than one multipod, $C_1$-$C_{30}$ hydrocarbyl-amine, and the like, unless otherwise specified.

The processes described herein may be carried out or performed in any suitable order as desired in various implementations. Additionally, in certain implementations, at least a portion of the processes may be carried out in parallel. Furthermore, in certain implementations, less than or more than the processes described may be performed.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Microwave Synthesis of Nickel Multipods

Size-tuneable nickel multipod structures were synthesized in this example using a pulsed microwave heating approach. The approach of this example provided control over growth and produced quality metallic nickel nanostructures with tight size distributions.

The approach of this example used only three reactants. The processes of this example were carried out under ambient conditions, and were completed within minutes with the use of a microwave reactor. Synthesis times for even the largest multipods of this example took less than 15 minutes with the pulsed microwave approach of this example.

The microwave power influenced the structure of the multipods of this example. The higher power pulses produced highly branched structures and longer arm lengths.

The kinetics of the reaction were believed to be important in successful synthesis of multipods that have not been easily achievable through convective heating means.

Results from this example suggested that a temperature difference between (i) the multipod tips and (ii) the rest of the nanoparticle was achieved through selective heating of the tips during the pulse step of the reaction of this example, and this temperature difference was believed to permit the arms to grow rapidly along the tip.

Particle analysis by pXRD, TEM, and SQUID revealed that the processes of this example produced pure fcc phase Ni structures with arms that grew along the <111> direction, and that exhibited magnetic coercivity behaviour at 300K. This behavior showed a positive correlation with the aspect ratio of the multipod arms.

The pulsed heating approach of this example can be applied to other material types, and was believed to demonstrate the role of microwave-matter interactions in the synthesis of materials using microwave-based heating.

The following procedure was used in this example: 0.75 mmol of nickel acetylacetonate, 25 mmol of oleylamine and 5 mmol of oleic acid were added to a G30 (30 mL) microwave vessel (Anton Paar USA Inc., USA) and sealed with a silicone septa and snap cap. The 9 mL of solution was degassed under vacuum with stirring at a temperature of about 100° C. using a water bath until no more bubbling was observed.

The solution turned blue upon completion. The pierced silicone septum was replaced with a polytetrafluoroethylene (PTFE) septum under ambient conditions, and no stir bar or inert atmosphere was used or introduced, respectively, in the reaction vessel. The vessel was then placed into an MONOWAVE™ 300 microwave system, and heated at a constant power of 300 W to 280° C. with the stir setting at 600 rpm.

Upon achieving a temperature of 280° C., one of several operational modes were used: (1) constant temperature mode (280° C.) (wherein the instrument maintained the temperature by adjusting the power automatically), and (2) constant power mode for a specific time (wherein the temperature of the reaction depended on the heating rate imparted by the delivery of continuous power), or (3) a custom setup wherein the instrument was programmed to cycle through cooling the reaction to a certain temperature (240° C. in this case) followed by heating with a desired constant power (e.g., 300 W, 250 W, 150 W) up to a certain temperature (280° C. in this example), which provided the ability to pulse the microwave for a number of cycles before the final automatic cool down to 55° C.

For experiments using an 10 mL silicon carbide vessel (SiC10) or a 10 mL glass vessel (G10), 3 mL of the solution was used in the reaction of this example.

For comparison purposes, a convective reaction using a round bottom flask was carried out to evaluate the proposed growth model.

FIG. 1 depicts a proposed growth mechanism for the Ni multipods grown under the pulsed MW conditions versus the continuous power conditions of this example. Not wishing to be bound by any particular theory, it is believed that the growth of Ni occurred via a 2-step autocatalytic process, wherein the slow step involved $Ni(acac)_2$ reduction by oleylamine to form a nuclei, followed by fast surface mediated growth in which the nickel nuclei is capped by oleylamine and oleic acid. Ammonia gas produced by the reduction mechanism of $Ni(acac)_2$ by oleylamine might also have acted as a small molecule with selective surface binding. The rates of growth were believed to be controlled by facet energy with the (111) facet being energetically favored. During the microwave pulse step, selective-heating of (111) tips on nanoparticle corners could permit faster autocatalytic growth at the tips, thereby leading to elongation of the (111) facet and forming the observed multipod structures, which are schematically depicted at FIG. 1. Under continuous power, the particle likely reached thermal equilibrium, thereby leading to facet reorganization.

The degree of experimental control achieved by pulsing versus continuous MW power was determined, at least in part, by electron microscopy images, which were collected for the products of this example. The images showed that initial nucleation and growth resulted in cubic structures that evolved towards (111) overgrowth when maintained under continuous power, but lead to high aspect ratio multipod morphologies under pulsed conditions.

The evolution from cubic to overgrowth to high aspect ratio multipods was analysed as a function of time (number of pulses) to produce a mechanism for growth that distinguished (i) autocatalytic growth observed in MW reactors for Ni under continuous heating from (ii) the onset of MW enhanced (111) facet growth under pulsed MW conditions.

Evolution of multipods under constant temperature mode for MW heating (variable power): The influence of time on multipod formation was evaluated under constant temperature conditions where the MW power was fluctuated to maintain temperature over the course of the reaction.

The reactions were carried out by heating a solution of $Ni(acac)_2$ dissolved in a 5:1 (V:V) ratio of oleylamine to oleic acid to 280° C. using an initial incident power of 300 W to reach 280° C., and allowing the power to fluctuate to maintain the reaction temperature. The reaction temperatures and microwave power profiles used during this set of reactions are shown at FIG. 2A, FIG. 2B, FIG. 2C, and FIG. 2D.

FIG. 2A, FIG. 2B, FIG. 2C, and FIG. 2D depict temperature and microwave power profiles for the nickel multipods under constant temperature mode for 3 minute (FIG. 2A), 4 minute (FIG. 2B), 6 minute (FIG. 2C), and 10 minute (FIG. 2D) reactions.

Figure 2A:
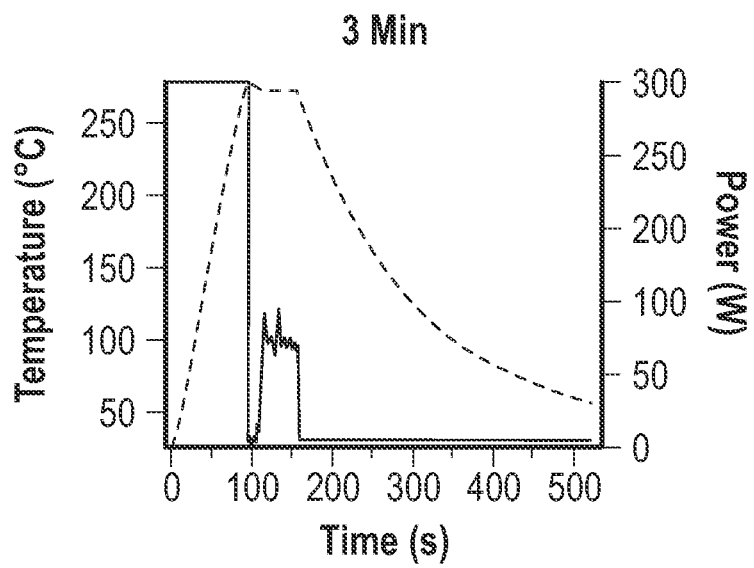
FIG. 2A, FIG. 2B, FIG. 2C, and FIG. 2D depict temperature and microwave power profiles for embodiments of nickel multipods formed under constant temperature mode reactions lasting 3 minutes (FIG. 2A), 4 minutes (FIG. 2B), 6 minutes (FIG. 2C), and 10 minutes (FIG. 2D) reactions.
Figure 2B:
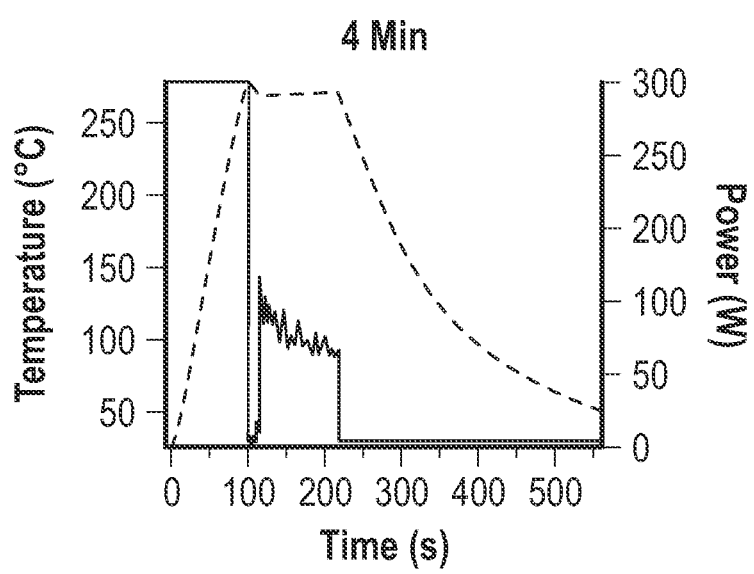
Figure 2C:
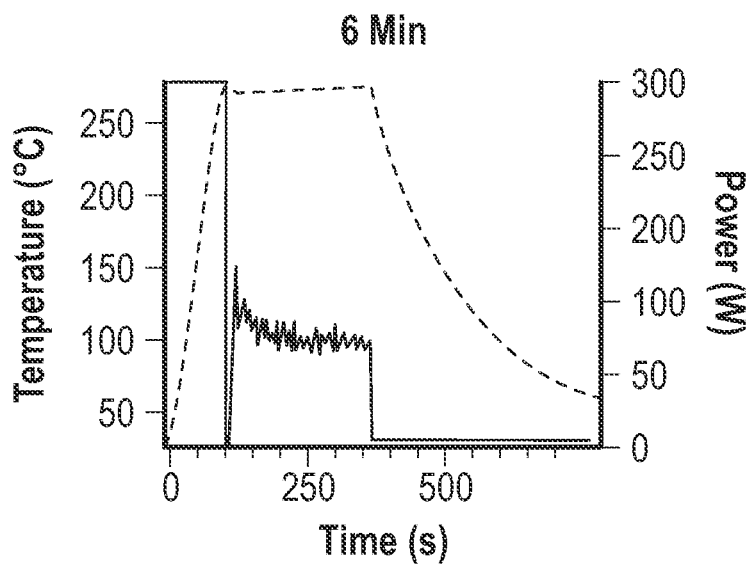
Figure 2D:
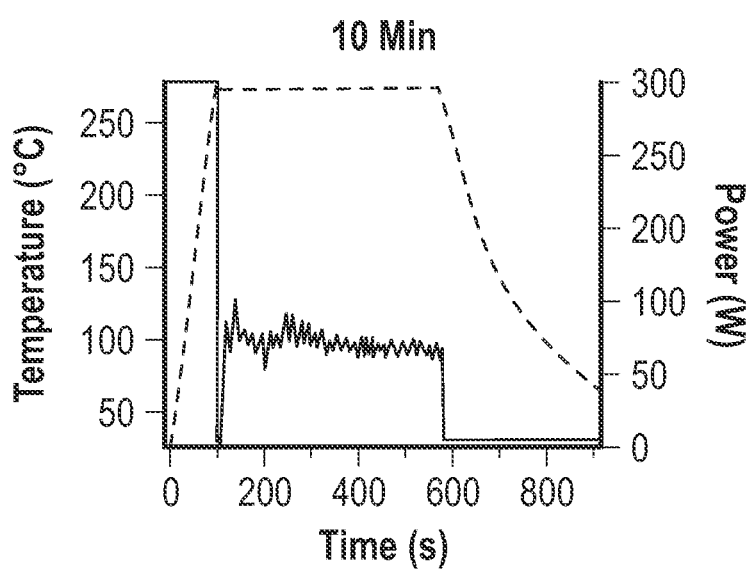

As depicted at FIG. 2A, the power pulses after 2 minutes dropped from 300 W to 0 W, with continuous power fluctuations at about 50 W to about 100 W during the reaction to maintain reaction temperature. Reactions carried out for 3 minutes (i.e., 1 minute beyond the pulse event), during the largest variance in power, produced irregularly-shaped nanoparticles, which exhibited overgrowth, but wide dispersities in size (about 20 nm to about100 nm).

After 4 minutes (i.e., 2 minutes beyond the pulse event), the nanoparticles grew larger and exhibited clear multipod morphology (e.g., an arm aspect ratio of 1.4) with tapering arms. From 6 minutes to 10 minutes, the particles exhibited variability in the multipod morphology, with large sphere-like cores with longer arms of uniform width and rounded ends extending out from the core (arm aspect ratio of about 1.6 to about 1.4). The stepped power experiment produced non-uniform shaped Ni, which was consistent with the 6-10 minute reactions.

Figure 3A:
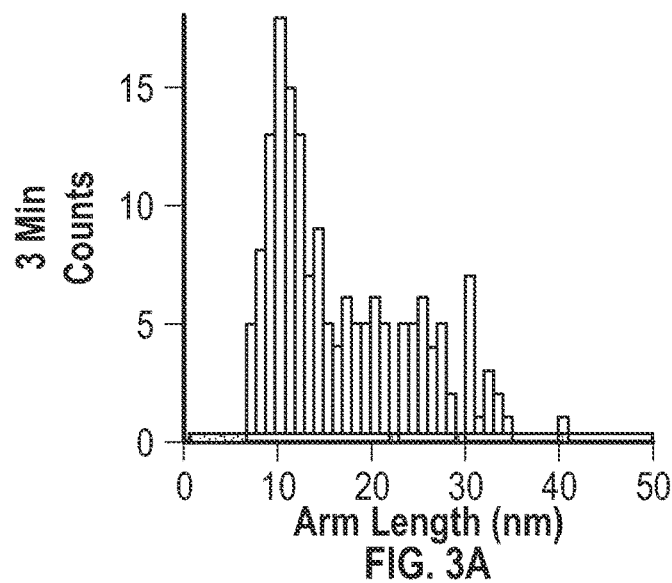
FIG. 3A, FIG. 3C, FIG. 3E, and FIG. 3G depict arm length distributions.
Figure 3B:
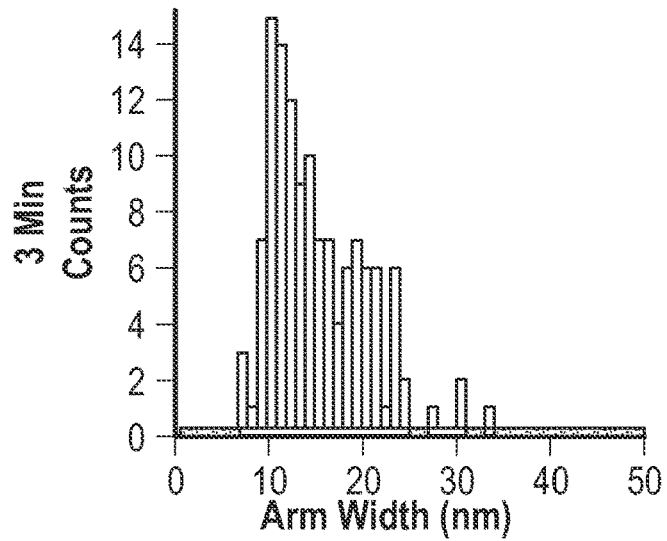
FIG. 3B, FIG. 3D, FIG. 3F, and FIG. 3H depict arm width distributions for embodiments of multipods after reactions of 3 minutes (FIG. 3A and FIG. 3B), 4 minutes (FIG. 3C and FIG. 3D), 6 minutes (FIG. 3E and FIG. 3F), and 10 minutes (FIG. 3G and FIG. 3H), respectively.
Figure 3C:
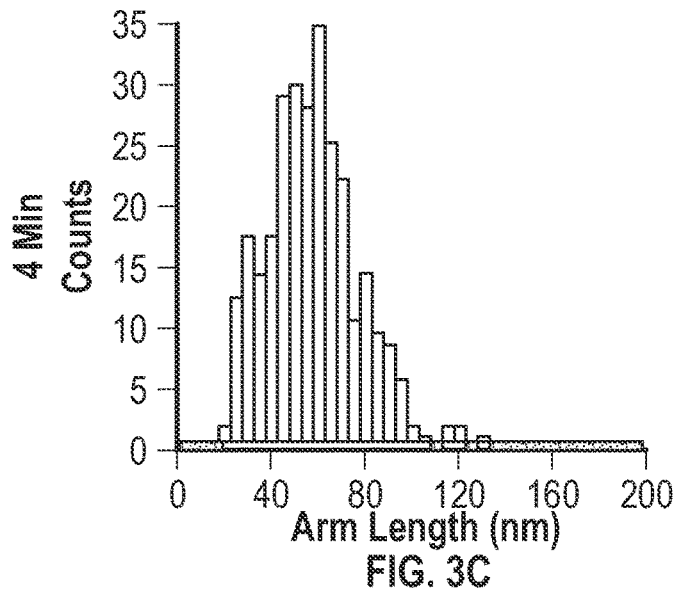
Figure 3D:
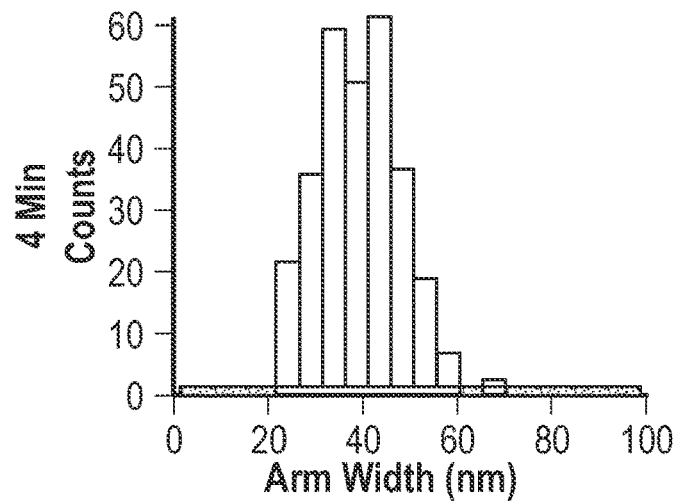
Figure 3E:
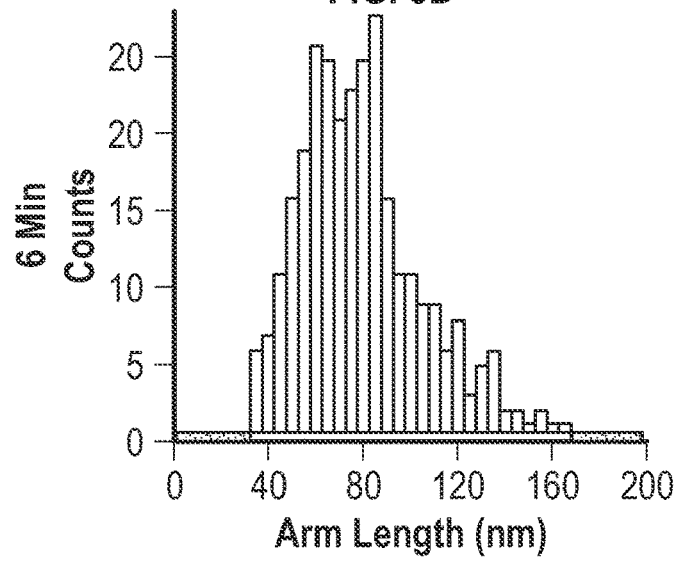
Figure 3F:
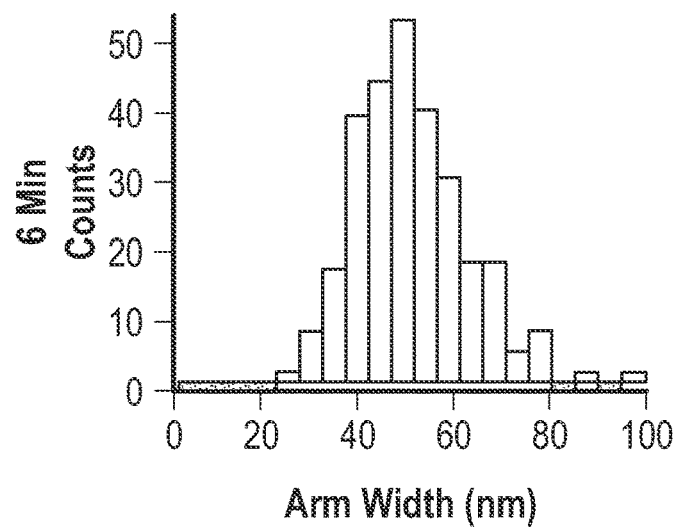
Figure 3G:
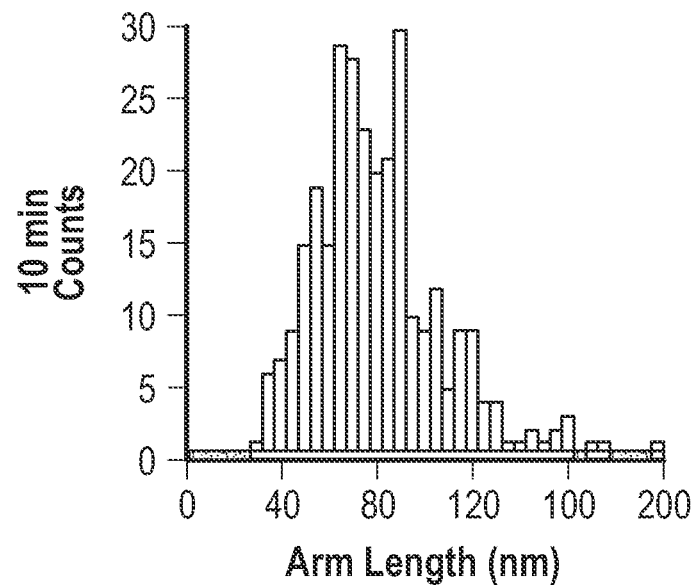
Figure 3H:
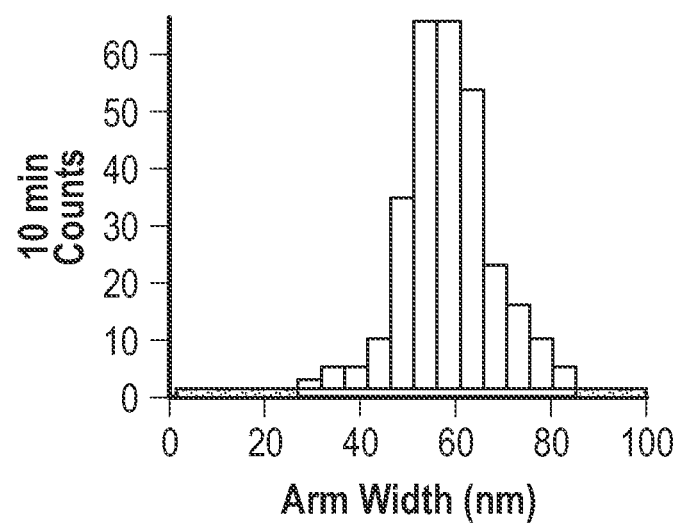

The average arm length, arm width, and aspect ratios were extracted from TEM images, and are reported at the following table (Table 1). Distributions extracted from the TEM images are provided at FIG. 3A, FIG. 3B, FIG. 3C, FIG. 3D, FIG. 3E, FIG. 3F, FIG. 3G, and FIG. 3H. FIG. 3A, FIG. 3C, FIG. 3E, and FIC. CG depict arm length distributions, and FIG. 3B, FIG. 3D, FIG. 3F, and FIG. 3H depict arm width distributions for the multipods of this example after reactions of 3 minutes, 4 minutes, 6 minutes, and 10 minutes, respectively.

TABLE 1

Multipod Arm Length, Width, and Aspect Ratio with Respective Standard Deviations for Various Reactions Using Constant Temperature Mode (FIG. 2A-FIG. 2D*)

| Reaction Time (minutes) | Arm Length (nm) | Arm Length Standard Dev. (nm) | Arm Width (nm) | Arm Width Standard Dev. (nm) | Aspect Ratio | Aspect Ratio Relative Standard Deviation |
|---|---|---|---|---|---|---|
| 3 | 16 | 7.5 | 14 | 5.1 | 1.1 | 0.59 |
| 4 | 55 | 19 | 38 | 10 | 1.4 | 0.44 |
| 6 | 77 | 26 | 50 | 13 | 1.6 | 0.43 |
| 10 | 81 | 31 | 58 | 10 | 1.4 | 0.42 |

*The reaction for constant power mode (75 W, 6 minutes) produced sphere-like nanoparticles with a diameter of 72 ± 12 nm.

Arm length was determined as the length from tip to base of the arm, and width was measured across the center region of the multipod arm. Analysis of the 10 minute multipod (FIG. 2D, FIG. 3G, and FIG. 3H) confirmed that the isolated samples were pure fcc crystal structures according to pXRD.

No clear correlation was observed between the length of reaction at 280° C. (constant temperature) and the appearance of multipod arms. The variance was believed to be attributed to the lack of reproducibility in the power pulses that arose under constant temperature mode in a MW, even with, on average, constant power with respect to time.

High resolution TEM of the arms indicated that the arms grew along the <111> direction with a d-spacing of 0.20 nm, with no visible glide plane errors. Specifically, a HRTEM image of the arms in the 4 minute reaction showed that the arms grew along the <111> direction with a d-spacing of 0.20 nm, with no visible glide plane errors. In the 10 minute reaction, the overgrowths on the 10 minute Ni nanoparticle also conformed to the <111> plan with a d-spacing of 0.20 nm. Powder X-ray diffraction (pXRD) patterns of the 10 minute reaction confirmed the d-spacing assignments to fcc Ni.

The lack of a clear power or time dependence on growth behavior using constant temperature was could likely be attributed to the large fluctuation in the MW power cycle profiles. To assess the effect of MW influence, controlled convective reactions were carried out under reaction conditions identical to those of the constant temperature studies of this example (280° C., 5:1 OAm:OAc, 0.08 M Ni(acac)$_2$) for 4 minutes in a preheated aluminum block and 1 hour using a round-bottom flask with a heating mantle (see Example 2).

In the convective reactions, the NiNPs appeared as spherical nanocrystals in SEM images. The formation of overgrowth and multipod arms was not observed under convective conditions. The lack of overgrowth under the experimental conditions was consistent with previous reports indicating that high temperature reactions may lead to spherical nanocrystals.

The shapes of the NiNPs grown under convective conditions compared to NiNPs grown in a MW were remarkably different. The NiNPS grown in a MW exhibited overgrowth leading to multipod structures. Inspection of the power vs. time graphs suggested that the multipod formation in the MW of this example was potentially due to the presence of pulsing.

Evolution of multipods under pulsed, i.e., cycled, microwave power (variable temperature and reaction time): The influence of pulsing on multipod formation was evaluated under variable temperature and time to evaluate whether pulsing of the impingent MW field directly correlated to the length of the arm observed in the MW reactions.

Figure 4A:
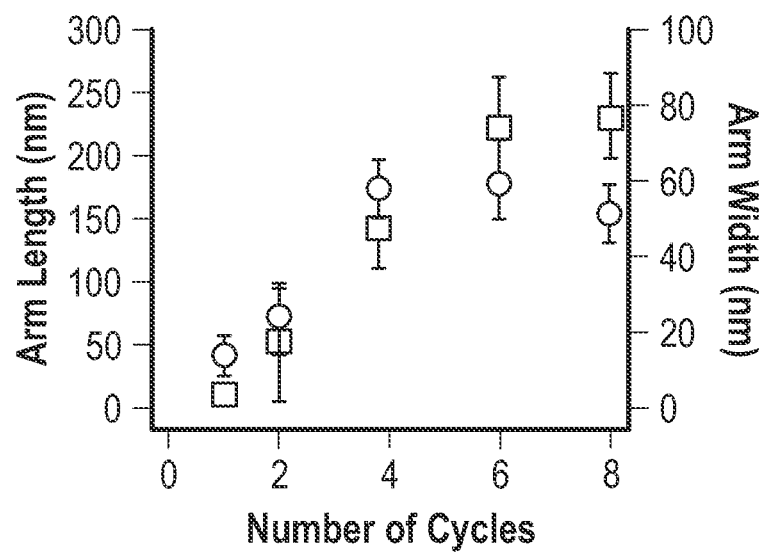
FIG. 4A depicts a plot of the length and width of embodiments of multipod arms as a function of the number of pulses applied after an initial pulse.
Figure 4B:
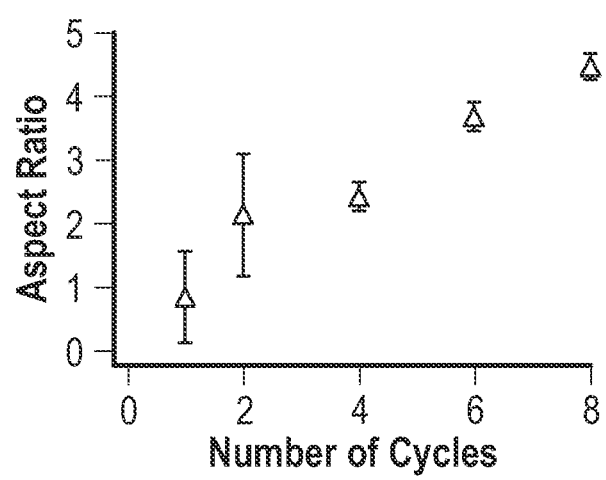
FIG. 4B depicts a plot of the aspect ratio of the arms of embodiments of multipod structures versus the number of pulses after an initial pulse.
Figure 5A:
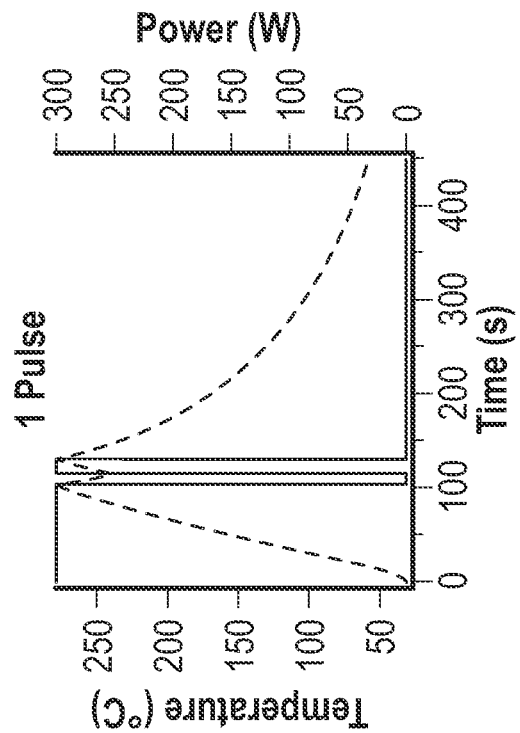
FIG. 5A, FIG. 5B, FIG. 5C, FIG. 5D, FIG. 5E, and FIG. 5F depict temperature and power profiles for an embodiment of a pulsed reaction after 0, 1, 2, 4, 6, and 8 pulses, respectively.
Figure 5B:
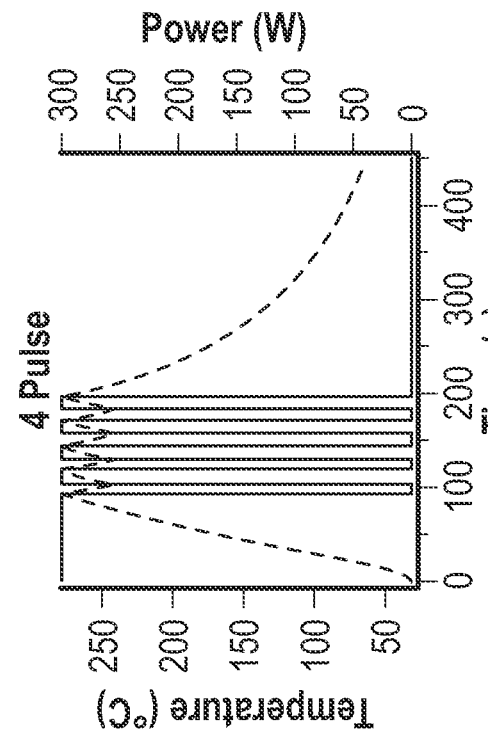
Figure 5C:
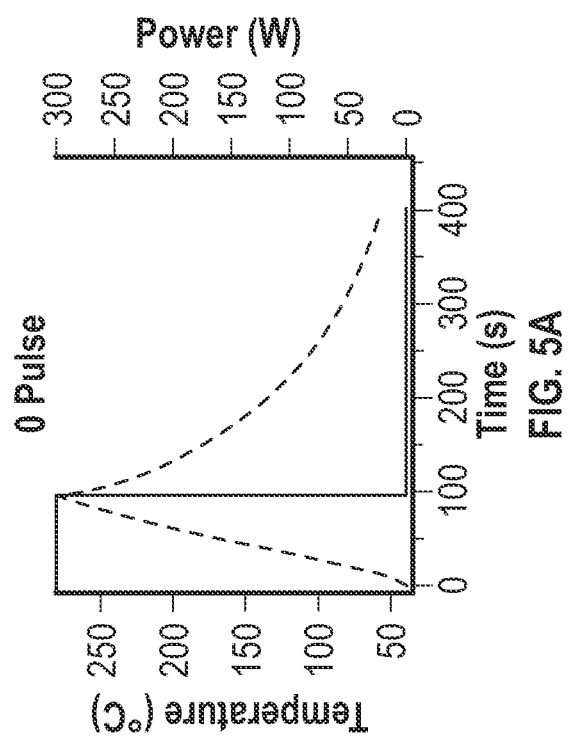
Figure 5D:
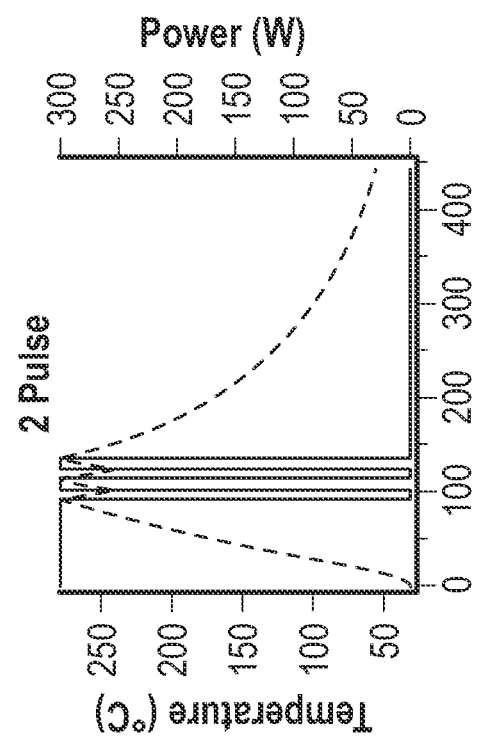
Figure 5E:
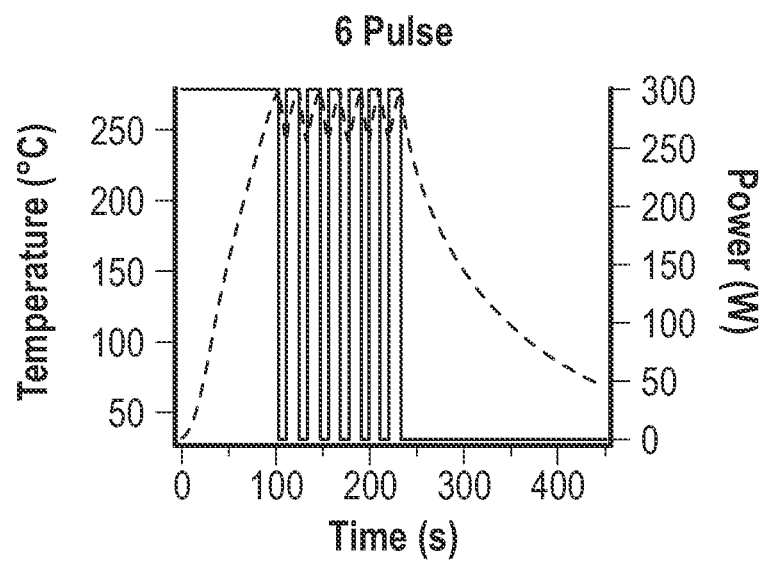
Figure 5F:
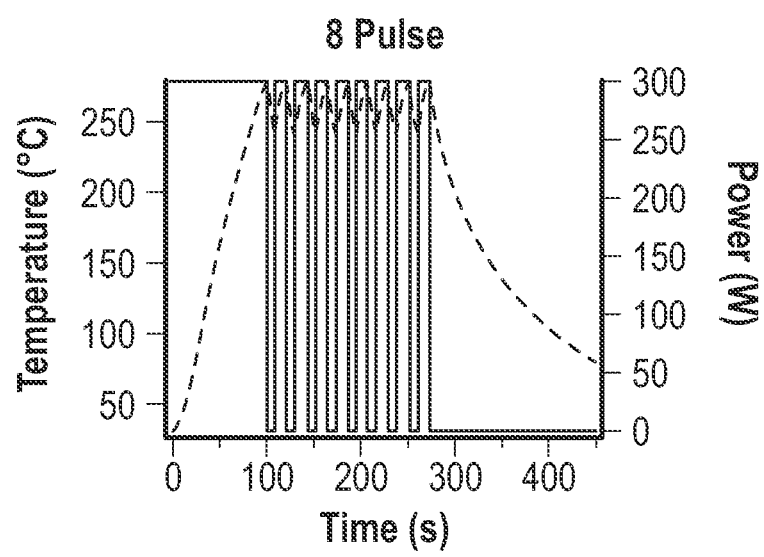

The evolution of nickel multipod structures synthesized using the pulsed power mode of this example with an increasing number of pulses was observed via TEM images at 0 pulses, 1 pulse, 2 pulses, 4 pulses, 6 pulses, and 8 pulses. High resolution TEM images showed the crystalline lattices of the multipod arms. FIG. 4A depicts a plot of the length and width of the multipod arms as a function of the number of pulses applied after the initial pulse, and FIG. 4B depicts a plot of the aspect ratio of arms versus the number of pulses after the initial pulse.

The reactions of this particular group were carried out under reaction conditions that were identical to those of the constant temperature study; however, the MW was pulsed at 300 W in a controlled fashion, and the temperature maximum was set to 280° C. The temperature was allowed to drop to 240° C. between pulses.

Figure 6:
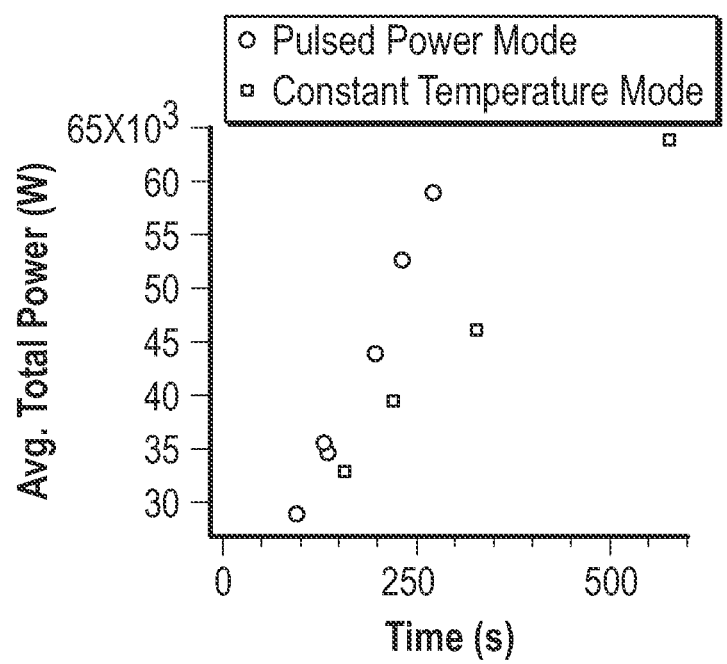
FIG. 6 depicts the overall MW power impingent during embodiments of reactions operated in pulsed power mode and constant temperature mode.

The temperature and power profiles for the pulsed reactions are provided at FIG. 5A, FIG. 5B, FIG. 5C, FIG. 5D, FIG. 5E, and FIG. 5F. The average temperature of the reaction was about 260° C. The overall MW power impingent of the samples was higher than the power impingent of the samples during constant temperature mode, as depicted at FIG. 6. For example, an 8 pulse reaction requiring 4.5 minutes of reaction time imparted a 38% higher MW power impingent on the reactants compared to the reaction at constant reaction temperature (280° C.) for the same reaction time.

At zero pulse (FIG. 5A), cube shaped nanoparticles of about 26 nm in diameter were observed. With an increasing number of pulses (FIG. 5B-FIG. 5F), anisotropic multipod structures were observed, wherein the arm length and aspect ratio increased with the number of pulses.

The isolated materials were fcc, based on powder X-ray diffraction data. The multipod structures had crystal structures that matched the fcc Ni reference pattern PDF #01-087-0712. As demonstrated by the plots of the average length of the arms and widths (FIG. 4A), as well as the aspect ratio (length/width) (FIG. 4B), the increase in arm length, arm width and aspect ratio appeared to be substantially linear.

Figure 7A:
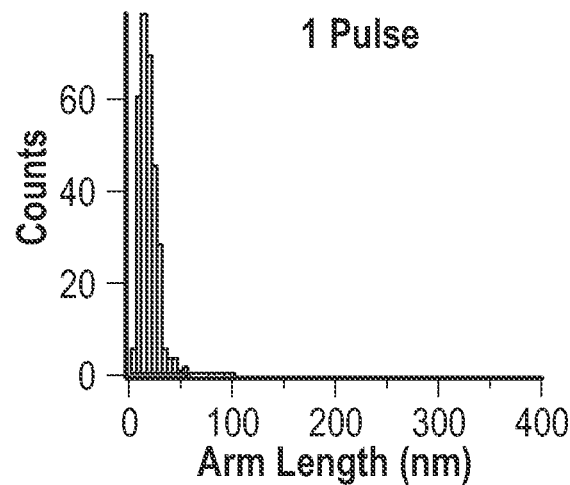
FIG. 7A, FIG. 7B, FIG. 7C, FIG. 7D, and FIG. 7E are histograms for the arm lengths of products resulting from an embodiment of a pulsed process after 1 pulse, 2 pulses, 4 pulses, 6 pulses, and 8 pulses, respectively.
Figure 7B:
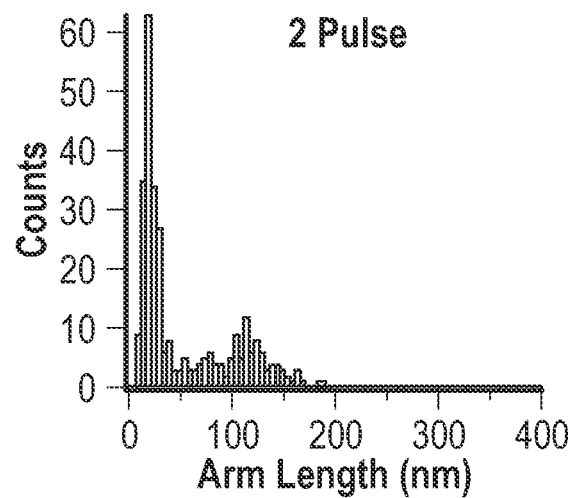
Figure 7C:
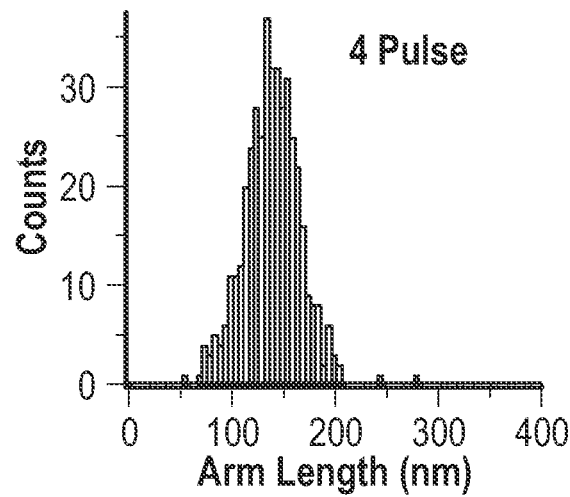
Figure 7D:
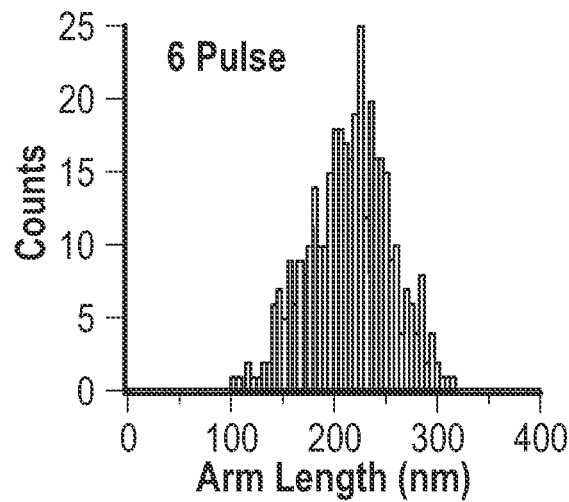
Figure 7E:
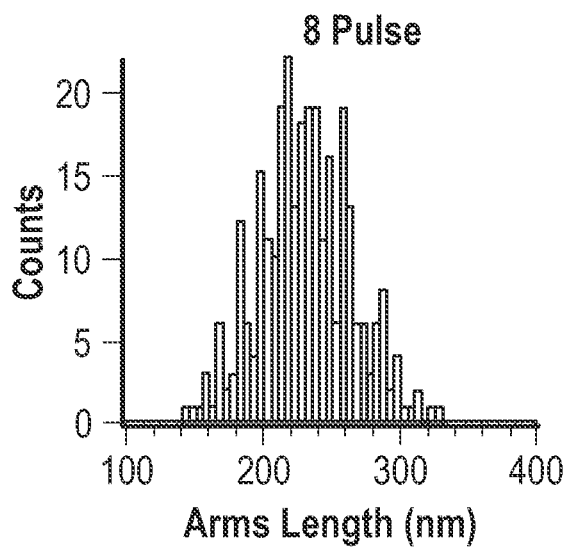
Figure 7F:
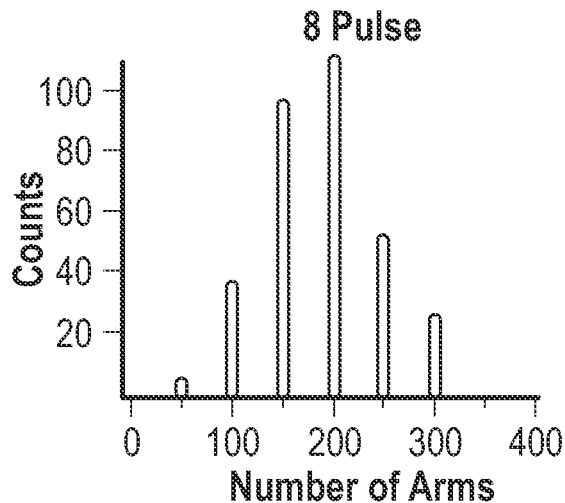
FIG. 7F depicts the number of structures having 1 to 6 arms of an embodiment of a pulsed process after 8 pulses.
Figure 8A:
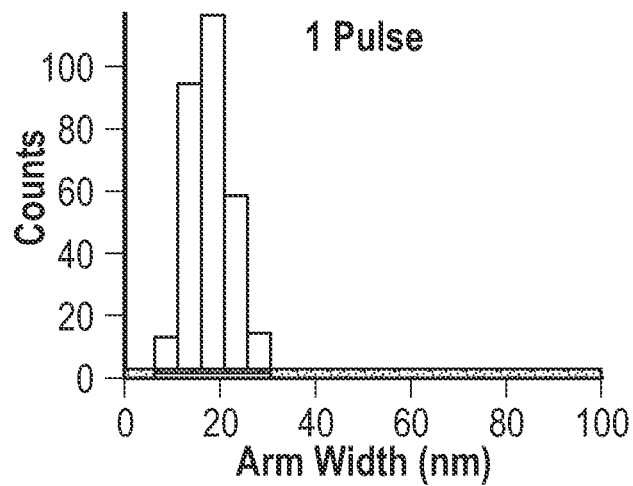
FIG. 8A, FIG. 8B, FIG. 8C, FIG. 8D, and FIG. 8E are histograms for arm width of products resulting from an embodiment of a pulsed process after 1 pulse, 2 pulses, 4 pulses, 6 pulses, and 8 pulses, respectively.
Figure 8B:
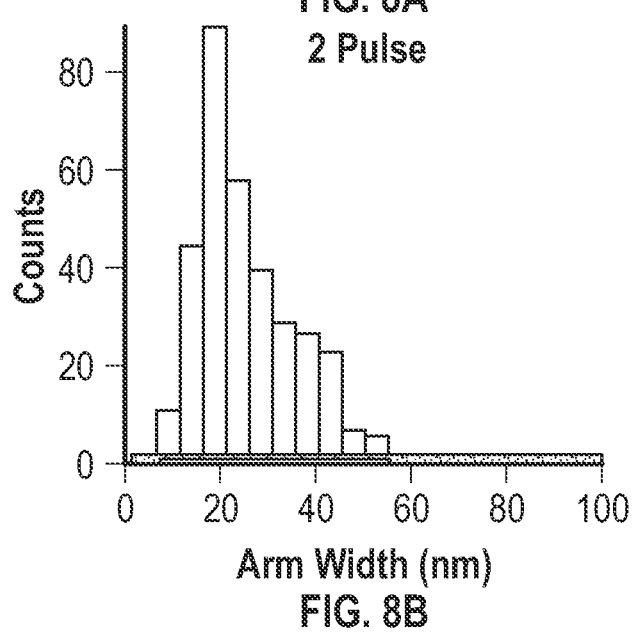
Figure 8C:
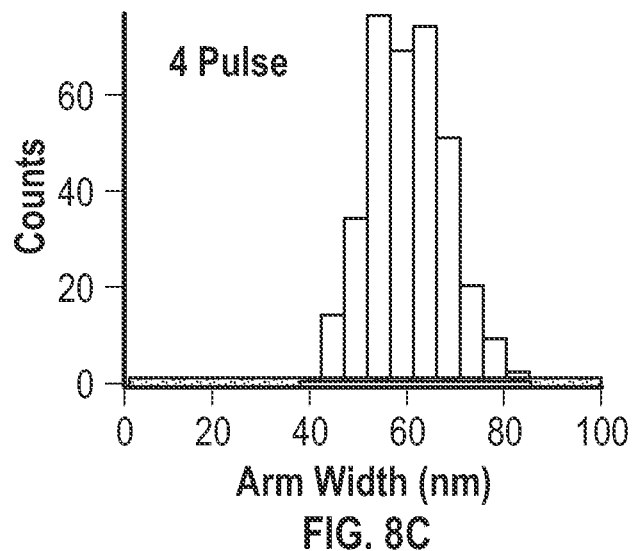
Figure 8D:
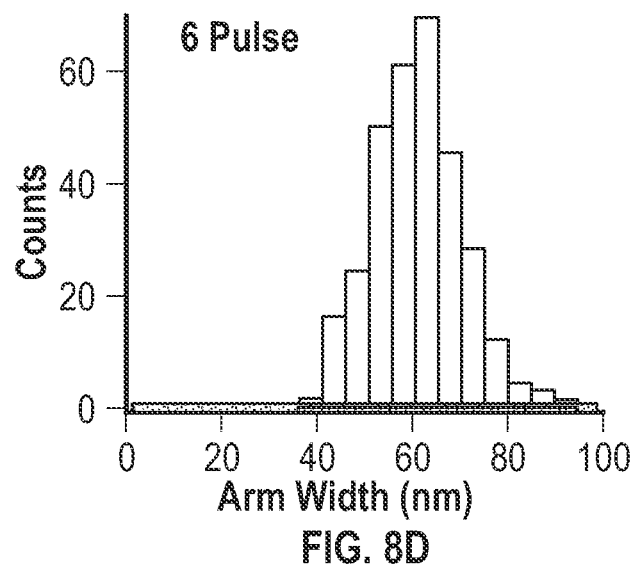
Figure 8E:
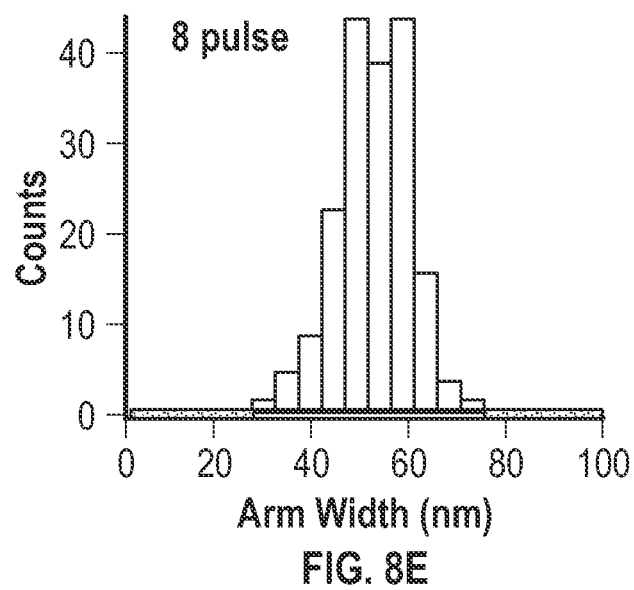

FIG. 7A, FIG. 7B, FIG. 7C, FIG. 7D, and FIG. 7E are histograms for arm length after 1 pulse, 2 pulses, 4 pulses, 6 pulses, and 8 pulses, respectively. FIG. 7F depicts the number of structures having 1 to 6 arms after 8 pulses. FIG. 8A, FIG. 8B, FIG. 8C, FIG. 8D, and FIG. 8E are histograms for arm width after 1 pulse, 2 pulses, 4 pulses, 6 pulses, and 8 pulses, respectively.

An analysis of an SEM image of the product of the 8 pulse reaction indicated >95% multipod formation (within 2σ) with an average of four arms per multipod. The distribution, as depicted at FIG. 7F, was a Gaussian distribution. The average length of the arms was 228±33 nm, and the average width was about 51±8.2 nm, which resulted in an aspect ratio of 4.5.

The multipod arms exhibited no glide plane errors, and grew as <111> extentions. High resolution TEM imaging of the 4 cycle and 8 cycle samples revealed that the arms were single crystal along the <111> direction, with d-spacing of 0.2 nm. A high resolution TEM image of some initially formed Ni cores (0 cycle reaction) and a region near the core-arm interface for the 8 cycle reaction had a defect-free single-crystalline nature.

Figure 9A:
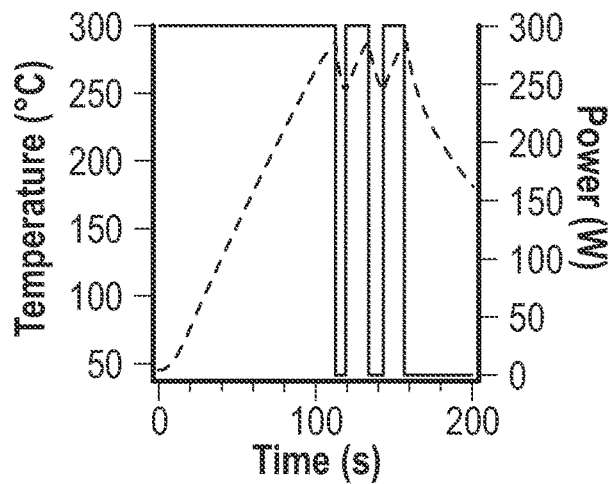
FIG. 9A, FIG. 9B, and FIG. 9C depict plots of microwave power and temperature versus time for three embodiments of methods described herein.
Figure 9B:
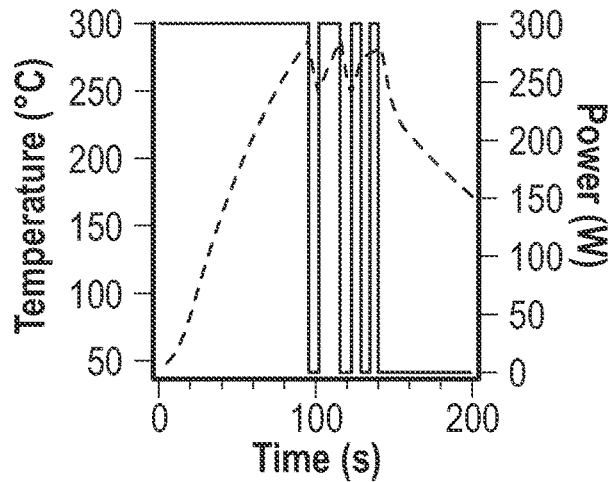
Figure 9C:
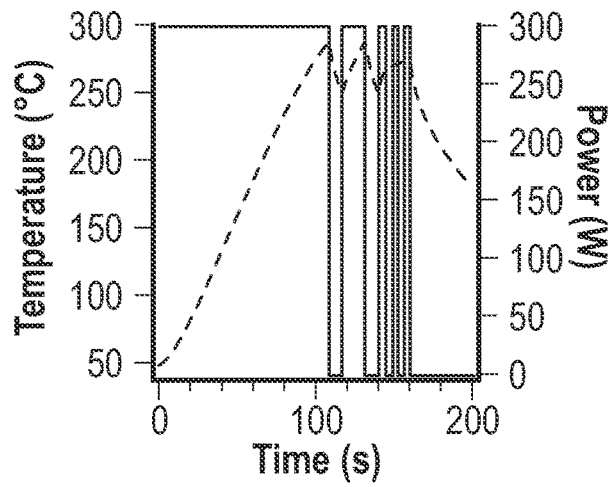

The increase in the aspect ratio for the <111> art is depicted for the 10 s MW-on cycles at FIG. 4B. The aspect ratio appeared to be linear with respect to the number of cycles. At FIG. 9A, FIG. 9B, and FIG. 9C, the impact of shorter MW heating cycles is depicted. Comparison of nearly equivalent heating times for a single 10 s cycle, two 5 s cycles, and three 3 s cycles following the initial 13 s MW irradiation event confirmed the control of aspect ratio. The arm length and width was extracted by analysis of 300 arms in SEM images. For the 10 s cycle (FIG. 9A), the arm length was 178±37.9 nm and the arm width was 57.6±7.87 nm (aspect ratio 3.1); for the two 5 s MW-on cycles (FIG. 9B), the lenth was 246±44.4 nm and the arm width was 42.2±10.1 nm (aspect ratio 5.8); and for the three 3 s MW-on cycles (FIG. 9C), the length was 277±49.6 nm and the arm width was 41.1±10.5 nm (aspect ratio 6.8). From the cycling study, it was demonstrated that for the shorter MW-on cycle times, thinner arms were observed.

The multipods of the pulsed experiments of this example were compared to those that resulted from the constant temperature experiments of this example, and the comparison revealed that under pulse conditions the uniformity of the multipods was significantly better, with a higher multipod density. The observed multipod density was believed to be the highest ratio reported to date, with >99% for processes of four or more pulses. The arms exhibited no glide plane errors and grew as (111) extensions.

The role of pulsing a MW to control multipod formation was further demonstrated in this example by using constant power followed by pulsing at the end of the reaction. The results of a 25 minute reaction carried out at constant temperature for 15 minutes, followed by >8 pulses led to multipod structures observed in the TEM image with >80% multipod formation, although other morphologies were present. The experiment led to larger core sizes (with an average arm length of 201±64 nm and a width of 59±13 (aspect ratio of 3.4)). The number of arms, on average, was four. While the results were not as uniform as the pulse-only experiments of this example, the observation of multipod growth confirmed the role of pulsing on multipod isolation.

Not wishing to be bound by any particular theory, it was believed that the growth of nickel nanoparticles of this example in a microwave followed an autocatalytic 2-step Finke-Watsky mechanism, wherein the first step involved a slow reduction step of the nickel precursor in solution by the weak reducing agent, oleylamine, and a fast reduction step of the nickel precursor at the surface of the growing nickel nanoparticle which acted as a catalyst. The presence of oleylamine and oleic acid (which both acted as capping ligands involved in shaping nanostructures), binded selectively to different facets of the evolving nickel nuclei based on differences in binding energies to different crystal facets. It also was believed that the surface atom rearrangement on crystals could control the shape of the final nanoparticle, and it was believed that the surface atom diffusion on the nickel nucleic was minimal and therefore gave rise to anisotropic structures.

Effect of cycle power on multipod evolution: Although it was desirable to measure the tip versus core of the Ni multipods of this example during the MW cycle to support and/or demonstrate the "lightning rode" mechanism, it was not practical to do so on the scale of the nanoparticles.

The microwave apparatus measured vessel temperature and not the nanoparticles' temperature directly. In order to demonstrate that growth behaviour was dependent on MW-on cycling leading to tip heating, a series of experiments were carried out wherein the influence of MW power on the growth behaviour was evaluated. It was believed that the high cycle powers would lead to hotter tips, even though the average reaction temperature was nearly constant. However, the time to achieve temperature was lengthened at lower power, which should have cause nanoparticle temperature equilibration. For the reasons of this example, a 10 mL reaction vessel was used, which likely impacted the MW energy absorbed and/or the growth rates.

SEM images revealed that the lowering of the power of the 4 cycle reaction to 150 W resulted a greatly reduced population of multipods, and the formation of mostly spherical nanoparticles (diameter=52.4±13.9 nm). This result differed from the result achieved by the 300 W 4 cycle reaction, which produced well-defined multi-pods (arm length=73.6±27.1, arm width=33.5±5.6 nm).

Two other experiments also were carried out, wherein the sequential cycle power of the 4 cycles was either increased or decreased by 50 W. When the cycle power was sequentially decreased from 300 to 150 W in a 4 cycle reaction, the nanostructures formed, according to SEM images, were more rounded, with very little overgrowth (arm length=22.2±6.7 nm, arm width=13.9±3.4 nm). In the other case, wherein the MW power of sequential cycles was increased from 150 to 300 W, multipods with longer arms were formed, according to SEM images (arm length=55.9±18.5 nm, arm width=28.0±5.2 nm).

The power dependent growth behaviour could be ascribed to a lower temperature differential between the core and the tips when the cycle power was sequentially decreased, which could have caused more uniform nanoparticle surface heating and growth. When, however, the cycle power was increased sequentially, the initially formed overgrowths continued to be selectively heated compared to the rest of the nanoparticle surface with subsequent high-power short-time cycles as previously described.

Role of ligands on multipod generation under constant temperature and cycled MW power modes: As a further check on the MW-on cycle-dependent growth, the influence of the ligand was investigated. A set of experiments was carried out under both constant temperature (8 minutes) and cycled MW power (4 cycles of 300 W), wherein the ratio of the OAm (reducing agent and capping agent) and OAc (capping agent) was varied. Also investigated was the effect of nanoparticle growth when the primary amine (OAm) was substituted with a tertiary amine, trioctylamine.

TEM and SEM images revealed that the reactions carried out at 5:1 OAm:OAc in the 10 mL reaction vessel produced multipod structures. The formation of the multipod was likely to be enhanced by the presence of OAc, due to its ligand-directing ability. Reactions carried out at 1:5 or 0:1 OAm:OAc did not yield product, likely due to too little reducing agent, which was consistent with the requirement of an amine to act as a reducing agent to initially cause a reduction of $Ni(acac)_2$ to initiate Ni growth.

When the MW experiments were carried out at 1:0 OAm:OAc, spherical-shaped nanoparticles were formed, which was consistent with the understanding that OAc directs, at least in part, nanoparticle shape. The isolated Ni spheres from the constant temperature conditions had a diameter of 74.5±13.0 nm, and following a reaction with 12 cycles at 300 W, the nanoparticle diameter was 137±37 nm.

The Ni nanoparticles formed using a 5:1 v/v TOA:OAc ratio also eliminated multipod growth under constant temperature and cycled MW power modes. Under the constant temperature mode, spherical nanoparticles with a diameter of 4.63±1.62 nm were isolated, whereas the cycled MW power mode produced large faceted nanoparticles with diameters of 173±70 nm. The loss of multipod structure may be been due to a loss of packing order at the surface, possible due to the presence of bound TOA.

Figure 10A:
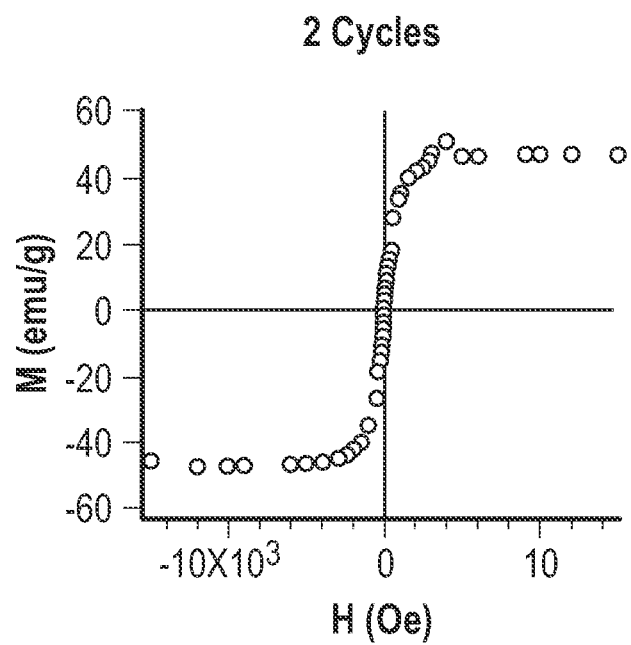
FIG. 10A, FIG. 10B, FIG. 10C, FIG. 10D, FIG. 10E, and FIG. 10F depict 300 K field sweep saturation magnetization curves for embodiments of metal multipod nanostructures.
Figure 10B:
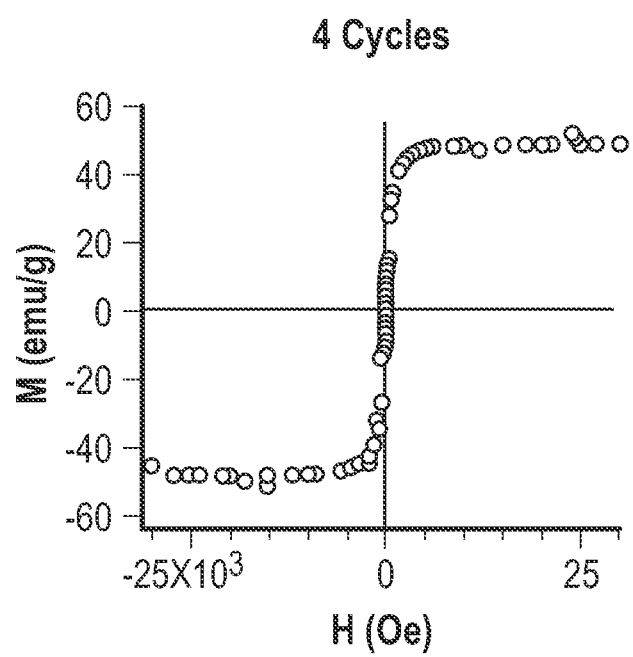
Figure 10C:
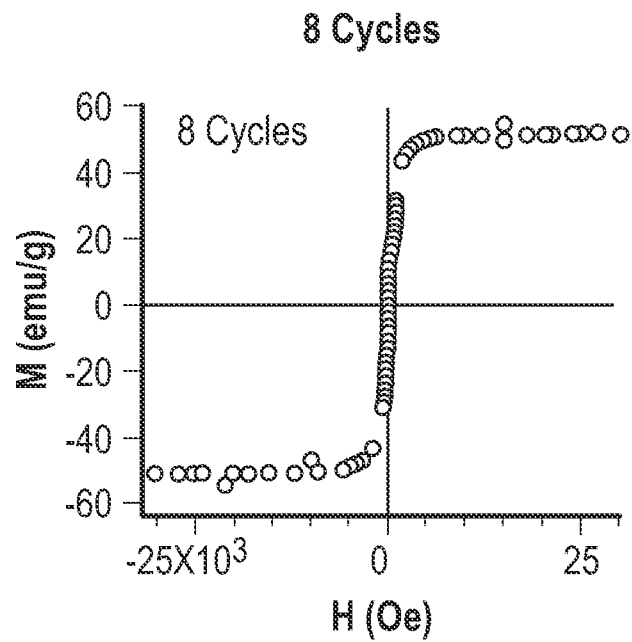
Figure 10D:
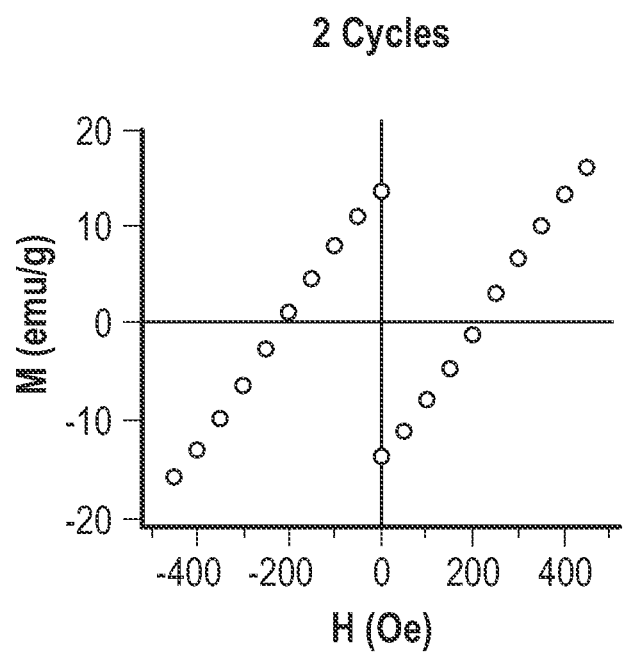
Figure 10E:
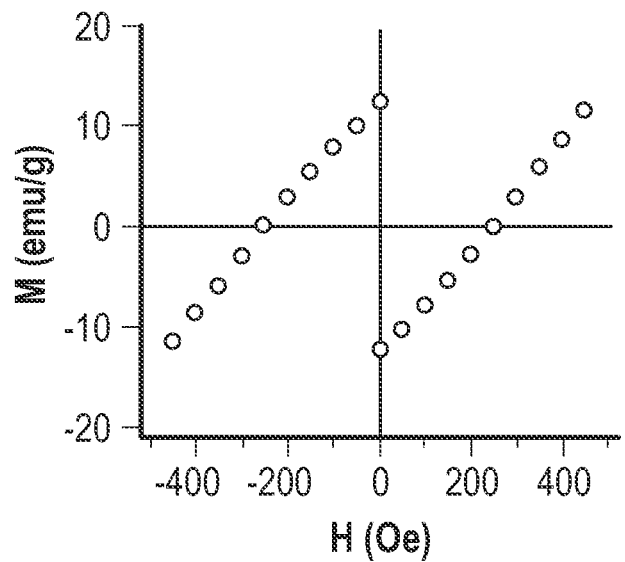
Figure 10F:
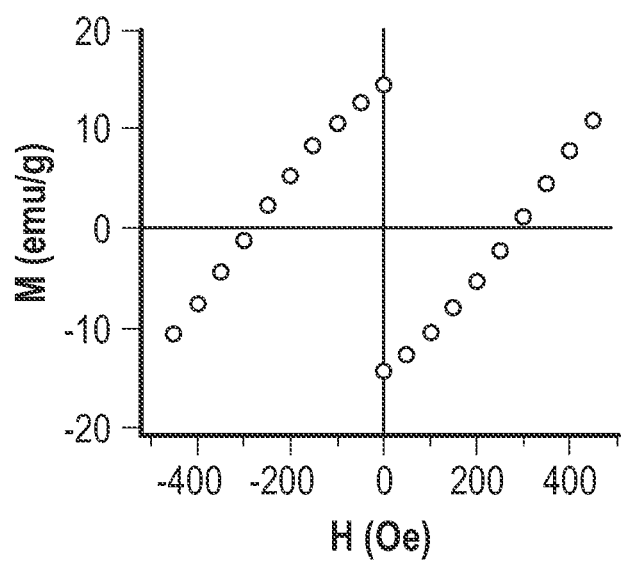
Figure 11A:
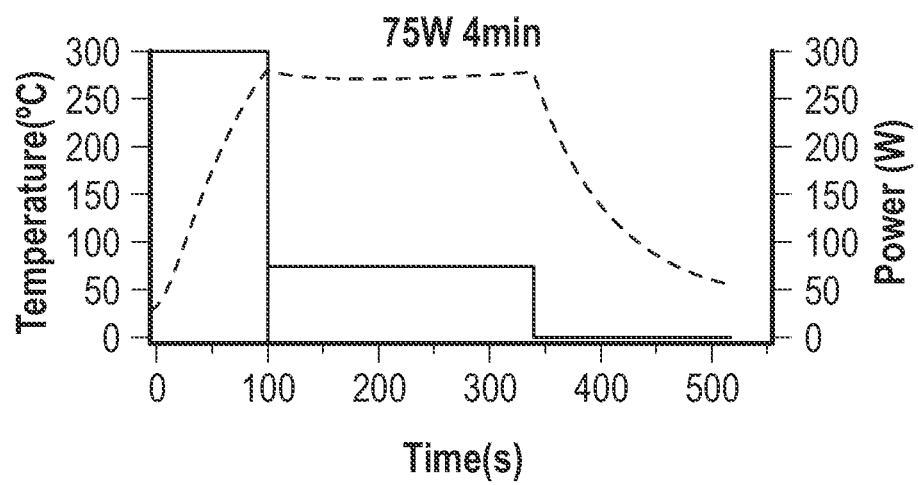
FIG. 11A, FIG. 11B, FIG. 11C, and FIG. 11D depict temperature and power profiles of embodiments of reactions carried out in a glass vessel (reaction volume of 3 mL) using either a constant power of 75 W for 4 minutes (FIG. 11A) or 4 pulses with different powers (150 W (FIG. 11B), 250 W (FIG. 11C), and 300 W (FIG. 11D)).
Figure 11B:
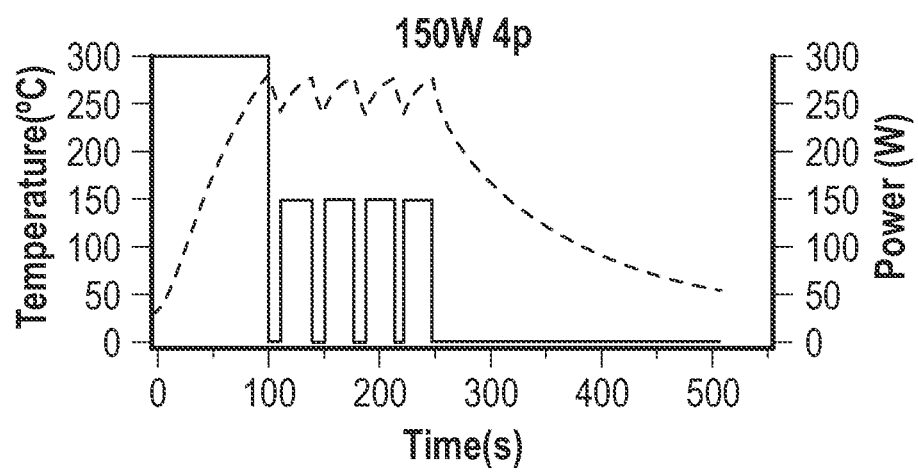
Figure 11C:
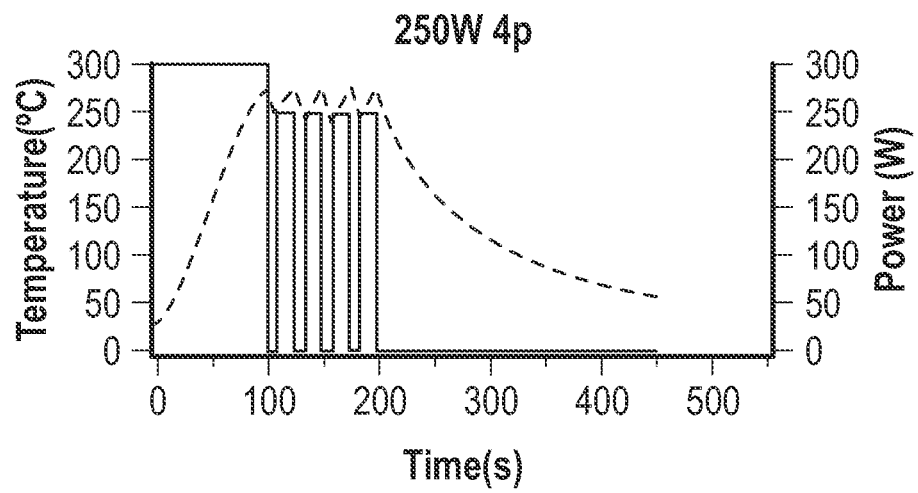
Figure 11D:
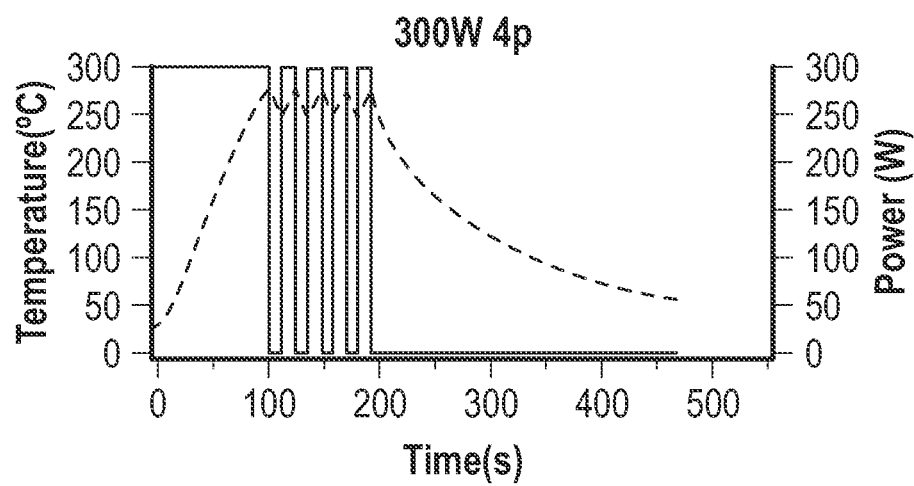

Analysis of the magnetic and thermal stability properties of Ni multipods: The multipod structures with high anisotropic structures may have applications in a range of technical fields, including magnetism and catalysis. The magnetic characterization and thermal stability of selected multipods, therefore, were analysed. The data are provided at FIG. 10A, FIG. 10B, FIG. 10C, FIG. 10D, FIG. 10E, and FIG. 10F, which depict 300 K field sweep saturation magnetization curves that show coercivity for multipods with arms having an aspect ratio of 2.17 (coercivity 215 Oe)(FIG. 10A and FIG. 10D), multipods with arms having an aspect ratio of 2.42 (coercivity 250 Oe)(FIG. 10B and FIG. 10E), and multipods of aspect ratio 4.47 (coercivity 283 Oe) synthesized using a cycle power of 300 W (10 s)(FIG. 10C and FIG. 10F).

The results from the magnetic field-sweep studies carried out at 300 K showed that the anisotropic nature of the multipod arms influenced the coercivity of the materials, while maintaining a high saturation magnetization value. The coercivity increased from 215 Oe (arm aspect ratio of 2.17) to 250 Oe (arm aspect ratio of 2.42) and finally 283 Oe (arm aspect ratio of 4.47) as the aspect ratio of the multipod arms increased. In comparison, the spherical Ni fcc nanoparticles of 55 nm diameter that were synthesized exhibited a coercivity of only 109 Oe at 300 K. The values of coercivity at 300 K for Ni multipods from the 8 cycle reaction were greater than that of many known Ni nanostructures.

In order to probe the structural stability of the multipods at higher temperatures, which are typically used for catalytic studies, a series of experiments was carried out wherein the multipod structures from the 300 W 8 cycle reaction were thermally heated at 200, 400, and 600° C. for 30 minutes in a thermogravimetric analysis (TGA) instrument and imaged by SEM post-treatment. The SEM images for the multipods pre- and post-thermal treatment showed that the multipod morphology was maintained even at 400° C. without any observation of reconstruction to spherical morphology.

At 600° C., the particles started to fuse with each other as ligand loss had taken place, and melting alongside surface reconstruction of the multipods seemed to occur at this temperature.

The following materials were used in the examples herein: 99%, nickel acetylacetonate hydrate ($Ni(acac)_2.xH_2O$), oleic acid (OAc), oleylamine (OAm) technical grade 70%, toluene, methanol (MeOH), acetone, and chloroform were purchased from Sigma Aldrich. The materials were used without further purification.

Example 2 Synthesis of Nickel Nanoparticles by Convective Heating

To further demonstrate that MW pulsing enhanced overgrowth and (111) facet elongation, convective reactions were carried out under identical reaction conditions (280° C., 5:1 OAm:OAc, 0.08 M $Ni(acac)_2$) for 4 minutes. In the convective reactions, the NiNPs appeared as spherical fcc nanocrystals, wherein the observed size increased with reaction time.

The formation of overgrowth and multipod arms was not observed under convective conditions. The lack of overgrowth under the experimental conditions was consistent with previous reports, whereing high temperature reactions led to spherical Ni nanocrystals.

The shapes of the Ni NPS grown under convective conditions compared to Ni NPs grown in a MW were remarkably different. The NiNPS grown in a MW exhibited overgrowth leading to multipod structures. Inspection of the power versus time graphs suggested that multipod formation in the MW was potentially due to the presence of pulsing.

Heating mantle method: 18 mL of the solution used to synthesize nickel multipods listed previously was added to a round bottom flask that was heated to 280° C. from room temperature (4° C./min) and held at 280° C. for 1 hr using a heating mantle after degassing under vacuum at 100° C. for 30 min. The reaction was cooled down quickly to room temperature using a blower and the nanoparticles were cleaned up.

Aluminum block method: A G10 vessel or SiC10 vessel containing 3 mL of solution and fitted with a septa and cap was placed in an aluminum block and degassed at 100° C. under vacuum for 30 minutes before heating to 280° C. (4° C./min), and being maintained for 4 minutes at that temperature prior to removal of the vessel from the block and cooling the vessel to room temperature using a blower.

Hot injection method: A well-insulated G10 vessel fitted with septa and cap was placed in an aluminum block and degassed at 100° C. under vacuum before being heated to 290° C. (4° C./minute) and stabilized at that temperature. A 3 mL solution that was degassed at 100° C. was injected rapidly into the pre-heated G10 vessel at 280° C. and maintained for 10 minutes prior to its removal and cooling to room temperature using a blower. The temperature of the reaction was observed to drop to 280° C. upon injection.

Example 3 Clean-Up and Analytical Techniques

Clean up of nanoparticles: Post-reaction, a small amount of toluene was added to the microwave vessel containing the nanoparticles, and the contents of the vessel were then sonicated.

The particles were pulled to the side of the vessel using a small magnet, and the supernatant solution was discarded. The particles were brought up in toluene and magnetically separated again. The same procedure was repeated using methanol instead of toluene.

This process was repeated for 2 cycles of toluene and methanol before the particles were dried under vacuum for characterization.

In the case of smaller particles that were not separated magnetically, the nickel nanoparticles were precipitated by the addition of 5 mL toluene followed by 15 mL of methanol. The resulting solution was centrifuged for 5 minutes using a centrifuge tube. After removing the supernatant, the pellet was redispersed in toluene. To precipitate the NiNPs, excess methanol was added, followed by isolation through centrifugation before drying under vacuum.

Transmission Electron Microscopy (TEM): Nanoparticle samples were drop-cast, from a toluene dispersion, onto 300 mesh carbon coated copper grids, and left to dry under vacuum overnight. The TEM images were recorded using a JEM-ARM200cF electron microscope at 200 kV acceleration voltage.

Scanning Electron Microscopy (SEM): SEM imaging was performed on aluminum mounts with nanoparticles drop-casted directly and allowed to dry. SEM imaging was performed on a FEI NOVA NANOSEM™ 400 scanning electron microscope operating at 20 kV with a spot size of 4.0. The images were collected with an Everhart-Thornley detector (ETD). An INCA™ X-Sight energy dispersive spectroscopy (Oxford Instruments, USA) (EDS) detector was used for EDS analysis.

Thermogravimetric Analysis (TGA): TGA was performed on a Q50 thermogravimetric analyzer (TA Instruments, USA). The samples were heated at a rate of 10° C./minute from room temperature to 105° C. and held for 10 minutes before continuing to ramp up the temperature at 10° C./min to 800° C. Measurements were performed under argon to prevent further oxidation.

Magnetic Measurements: Magnetic properties were studied with a superconducting quantum interference device (SQUID) magnetometer, MPMS-XL (Quantum Design). Field-dependent magnetization was measured at 300 K, with the applied field varying from 0 T to 1.5 T and back.

Magnetic properties of different pulse number multipods: Hysteresis loops at 300 K were plotted.

Field sweep studies at 300 K from −1.5 T to 1.5 T were carried out on some of the multipod structures. The saturation magnetization of the multipods did not differ significantly, but a clear difference in coercivity was observed between the samples, with the coercivity increasing as the aspect ratio increases.

The coercivity at 300 K was found to be 200 Oe, 250 Oe, and 275 Oe for the multipods with arms of aspect ratios 1, 2.4 and 4.5 respectively. This value was quite high for nickel nanoparticles at 300 K and likely would be significantly increased at lower temperatures.

This was believed to suggest that shape anisotropy played a role in the magnetic properties of the multipods, and could be tuned by changing the aspect ratios of the arms (Cowburn, R. P. "Property variation with shape in magnetic nanoelements." Journal of Physics D: Applied Physics 33.1 (2000): R1). Coercivity in nickel has been reported to range between 0-290 Oe.

Powder X-Ray Diffraction (pXRD): The pXRD patterns for Ni nanoparticles were acquired on a Rigaku Ultima III diffractometer equipped with a Cu-Kα source. Data was collected at room temperature, in the 2θ range of 10-84°.

Pulse power effect: In order to investigate the effect of the microwave pulse width (and directly pulse power), which can affect the heating rate between 240° C. and 280° C., a number of reactions were carried out wherein the power of the pulse was reduced to 250 W and 150 W.

The temperature and power profiles for these reactions are provided at FIG. 11A-FIG. 11D. FIG. 11A-FIG. 11D depict the temperature and power profiles of different reactions carried out in a glass vessel (reaction volume of 3 mL) using either constant power of 75 W for 4 minutes (FIG. 11A) or 4 pulses with different powers (150 W (FIG. 11B), 250 W (FIG. 11C), and 300 W (FIG. 11D)). The average pulse time was 27 s (150 W), 15 s (250 W) and 13 s (300 W) to transition from 240° C. to 280° C., and 10 s to cool from 280° C. to 240° C. (in all cases). As the power of the pulse increased, the pulse width and overall reaction time decreased. Each reaction was initially brought to 280° C. using 300 W constant power to allow a similar nucleation process.

The nanoparticles from reactions using 75 W for 4 minutes and 4 pulses of 150 W did not show significant numbers of nanoparticles with arms, and the nanoparticles appeared to be more spherical or oblong. The nanoparticles synthesized with 4 pulses of 250 W were observed to be smaller, with shorter arms compared to those made using 4 pulses of 300 W. This set of experiments indicated the flux of microwave energy was more important, at least in this example, for producing longer arm multipod structures than the total power delivered or total reaction time above 240° C.

Vessel effect: To elucidate the role of microwave heating, an equivalent 4-pulse reaction was carried out in a G10 and a SiC10 vessel.

The SiC vessel had a higher thermal conductivity and microwave absorption cross-section compared to the glass vessel, which allowed it to heat/cool faster and reduce the microwave energy penetration.

The nanoparticles from the SiC vessel showed a mixture of morphologies, including spherical particles, multipods with short arms, and a number of large flat sheet-like structures. The particles from reaction performed in the glass vessel showed more uniform multipod structures.

A possible reason for the poor size and shape control in the SiC vessel might have been a thermal gradient created in the SiC vessel from the hot inner surface of the vessel to a cooler region in the centre of the vessel, due, at least in part, to the high thermal conductivity of SiC and lower microwave energy penetration into the solution.

Attempts to synthesize the multipods using convective heating using a round bottom flask and mantle, or an aluminium block with the G10 and SiC10 vessel were unsuccessful and produced spherical nickel nanoparticles.

To account for the initial heating ramp rate, a reaction solution at 100° C. was injected into a preheated G10 vessel at 290° C. in a sand bath, but the resulting reaction did not produce nanoparticles, even after 10 minutes. These results suggested that kinetics and heating mode of the solution are important factors, at least in this example, for the formation of nickel multipods.

Nickel precursor concentration effect: The effect of Ni(acac)$_2$ concentration on pulsed-power multipod evolution was studied. SEM images of isolated materials from pulsed microwave reaction (4 pulses of 300 W after achieving 280° C.) with ratios of 0.75:50:10 Ni(acac)$_2$:OAm:OAc mol ratio, 1.5:50:10 Ni(acac)$_2$:OAm:OAc mol ratio, (C) 3:50:10 Ni(acac)$_2$:OAm:OAc mol ratio, and 6:50:10 Ni(acac)$_2$:OAm:OAc mol ratio were collected and analysed.

Nickel precursor type effect: The effect of Ni precursor choice on pulsed-power multipod evolution was analyzed. SEM images were collected of isolated materials from pulsed microwave reactions (4 pulses of 300 W after achieving 280° C.) with ratios of 1.5:50:10 Ni(acac)$_2$:OAm:OAc mol ratio using (A) Ni(acac)$_2$, (B) Ni(acetate)$_2$ and (C) NiCl$_2$.

The invention claimed is:

1. A method of forming metal multipod nanostructures, the method comprising:
providing a mixture disposed in a microwave reaction vessel, the mixture comprising—
a metal acetylacetonate,
a reducing agent comprising a $C_1$-$C_{30}$ hydrocarbylamine, and a carboxylic acid of formula (A)—

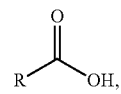

formula (A)

wherein R is a monovalent $C_1$-$C_{30}$ hydrocarbyl; and
contacting the mixture with microwaves to form the metal multipod nanostructures;
wherein the contacting of the mixture with microwaves comprises (i) contacting the mixture with a first plurality of microwaves effective to heat the mixture to a first temperature, (ii) reducing the first temperature of the mixture to a second temperature, (iii) contacting the mixture with a second plurality of microwaves for a time effective to heat the mixture to the first temperature, and repeating steps (ii) and (iii) from 1 to 8 times;
wherein the first temperature is about 260° C. to about 300° C.

2. The method of claim 1, wherein the second temperature is about 220° C. to about 250° C.

3. The method of claim 1, wherein the time effective to heat the mixture to the first temperature with the second plurality of microwaves is about 1 minute to about 20 minutes.

4. The method of claim 1, wherein the second plurality of microwaves comprises microwaves of different wattages.

5. The method of claim 1, wherein the second plurality of microwaves consists of microwaves of the same wattage.

6. The method of claim 1, wherein the metal acetylacetonate and the reducing agent are present in the mixture at a mole ratio of about 0.3:25 to about 3:25.

7. The method of claim 1, wherein the reducing agent and the carboxylic acid of formula (A) are present in the mixture at a mole ratio of about 25:2 to about 25:8.

8. The method of claim 1, wherein the metal acetylacetonate comprises a Ni acetylacetonate.

9. The method of claim 1, wherein the metal acetylacetonate is selected from the group consisting of a Pt acetylacetonate, a Pd acetylacetonate, a Cu acetylacetonate, a Co acetylacetonate, a Au acetylacetonate, an Fe acetylacetonate, and a Rh acetylacetonate.

10. The method of claim 1, wherein the $C_1$-$C_{30}$ hydrocarbyl-amine is an unsaturated $C_1$-$C_{30}$ hydrocarbyl-amine.

11. The method of claim 1, wherein the $C_1$-$C_{30}$ hydrocarbyl-amine is oleylamine.

12. The method of claim 1, wherein the carboxylic acid of formula (A) is oleic acid.

\* \* \* \* \*